United States Patent [19]
Lambrecht

[11] Patent Number: 5,905,879
[45] Date of Patent: May 18, 1999

[54] SYSTEM AND METHOD FOR TRANSFERRING PERIODIC DATA STREAMS ON A MULTIMEDIA BUS

[75] Inventor: Andy Lambrecht, Austin, Tex.

[73] Assignee: Advanced Micro Devices, Inc., Sunnyvale, Calif.

[21] Appl. No.: 08/927,905

[22] Filed: Sep. 10, 1997

Related U.S. Application Data

[63] Continuation of application No. 08/559,662, Nov. 20, 1995, abandoned.

[51] Int. Cl.$^6$ ........................................... G06F 13/14
[52] U.S. Cl. ..................... 395/297; 395/308; 395/309
[58] Field of Search ..................................... 395/280–309

[56] References Cited

U.S. PATENT DOCUMENTS

| | | |
|---|---|---|
| 4,245,344 | 1/1981 | Richter . |
| 4,991,169 | 2/1991 | Davis et al. . |
| 5,208,745 | 5/1993 | Quentin et al. . |
| 5,245,322 | 9/1993 | Dinwiddie, Jr. et al. . |
| 5,274,763 | 12/1993 | Banks . |
| 5,274,784 | 12/1993 | Arimilli et al. . |
| 5,325,423 | 6/1994 | Lewis . |
| 5,345,566 | 9/1994 | Tanji et al. . |
| 5,404,463 | 4/1995 | McGarvey . |
| 5,450,551 | 9/1995 | Amini et al. . |
| 5,487,167 | 1/1996 | Dinallo et al. . |
| 5,497,373 | 3/1996 | Hulen et al. . |
| 5,519,839 | 5/1996 | Culley et al. . |
| 5,526,017 | 6/1996 | Wilkie . |
| 5,530,902 | 6/1996 | McRoberts et al. . |
| 5,533,205 | 7/1996 | Blackledge, Jr. et al. . |
| 5,557,757 | 9/1996 | Gephardt et al. . |
| 5,564,001 | 10/1996 | Lewis . |

OTHER PUBLICATIONS

PCI Local Bus Specification, Revision 2.1, pp. 7–19, Jun. 1, 1995.

PCI Local Bus—*PCI Multimedia Design Guide* —Revision 1.0—Mar. 29, 1994, 43 pages.

*Primary Examiner*—Ayaz R. Sheikh
*Assistant Examiner*—Jigar Pancholi
*Attorney, Agent, or Firm*—Conley, Rose & Tayon; Jeffrey C. Hood

[57] ABSTRACT

A computer system optimized for real-time applications which provides increased performance over current computer architectures. The system includes a standard local system bus, such as the PCI bus, and also includes a dedicated real-time bus or multimedia bus. Thus multimedia devices such as video cards, audio cards, etc., as well as communications devices, transfer real-time data through a separate bus without requiring arbitration for the PCI bus. The computer system of the present invention thus provides much greater performance for real-time applications than prior systems. In various embodiments, multimedia devices transmit addressing and control information for a multimedia bus transfer either over the PCI bus or using a separate serial control channel. The multimedia bus may also comprise separate multimedia channels for different data types. Methods are also disclosed for transferring periodic multimedia data over the multimedia bus

21 Claims, 25 Drawing Sheets

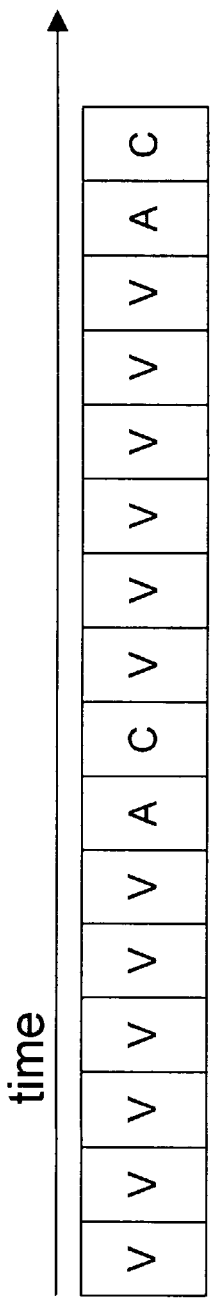
a) equal sized time slots with number of time slots allocated to streams in proportion to required bandwidth. V = Video, A = Audio
FIG. 12A
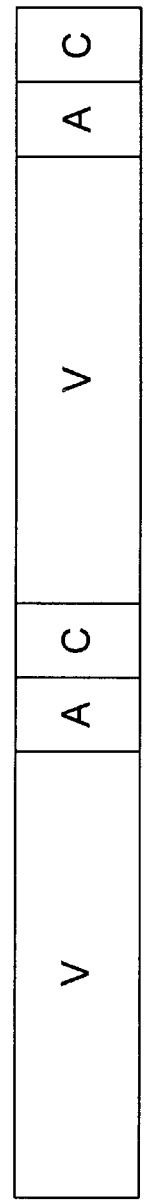
b) non-equal sized time slots with number of time slots allocated to streams in proportion to required bandwidth. V = Video, A = Audio
FIG. 12B
FIG. 12

SYSTEM AND METHOD FOR TRANSFERRING PERIODIC DATA STREAMS ON A MULTIMEDIA BUS

This application is a continuation of application No. 08/559,662, filed Nov. 20, 1995, now abandoned.

FIELD OF THE INVENTION

The present invention relates to a computer system which includes a system expansion bus such as the Peripheral Component Interconnect (PCI) bus and also includes a separate real-time or multimedia bus which transfers periodic and/or multimedia stream data for increased system performance for multimedia and real-time applications.

DESCRIPTION OF THE RELATED ART

Computer architectures generally include a plurality of devices interconnected by one or more various buses. For example, modern computer systems typically include a CPU coupled through bridge logic to main memory. The bridge logic also typically couples to a high bandwidth local expansion bus or system expansion bus, such as the peripheral component interconnect (PCI) bus or the VESA (Video Electronics Standards Association) VL bus. Examples of devices which can be coupled to local expansion buses include video accelerator cards, audio cards, telephony cards, SCSI adapters, network interface cards, etc. An older type expansion bus is generally coupled to the local expansion bus for compatibility. Examples of such expansion buses included the industry standard architecture (ISA) bus, also referred to as the AT bus, the extended industry standard architecture (EISA) bus, or the microchannel architecture (MCA) bus. Various devices may be coupled to this second expansion bus, including a fax/modem, sound card, etc.

Personal computer systems were originally developed for business applications such as word processing and spreadsheets, among others. However, computer systems are currently being used to handle a number of real time applications, including multimedia applications having video and audio components, video capture and playback, telephony applications, and speech recognition and synthesis, among others. These real time applications typically require a large amount of system resources and bandwidth.

One problem that has arisen is that computer systems originally designed for business applications are not well suited for the real-time requirements of modern multimedia applications. For example, modern personal computer system architectures still presume that the majority of applications executing on the computer system are non real-time business applications such as word processing and/or spreadsheet applications, which execute primarily on the main CPU. In general, computer systems have not traditionally been designed with multimedia hardware as part of the system, and thus the system is not optimized for multimedia applications. Rather, multimedia hardware is typically designed as an add-in card for optional insertion in an expansion bus of the computer system, wherein the expansion bus is designed for non-realtime applications.

In many cases, multimedia hardware cards situated on an expansion bus do not have the required system bus bandwidth or throughput for multimedia data transfers. For example, a multimedia hardware card situated on the PCI expansion bus must first arbitrate for control of the PCI bus before the device can begin a data transfer or access the system memory. In addition, since the computer system architecture is not optimized for multimedia, multimedia hardware devices are generally required to share bus usage with non-real time devices.

Also, multimedia hardware devices generally do not make efficient usage of system resources. As an example, multimedia hardware cards typically include their own memory in addition to system memory. For example, video accelerator cards are typically configured with one to four Megabytes of video RAM. Audio cards, video capture cards, and other multimedia cards are also generally configured with dedicated on-board memory. This requirement of additional memory adds undesirable cost to the system.

As multimedia applications become more prevalent, multimedia hardware will correspondingly become essential components in personal computer systems. Therefore, an improved computer system architecture is desired which is optimized for real-time multimedia and communications applications as well as for non-realtime applications. In addition, improved methods are desired for transferring real-time data between multimedia devices.

Applicant is aware of two new graphics standards from the Video Electronics Standards Association (VESA) which are designed to improve digital video transfers in computer systems. These two standards are referred to as the VESA advanced feature connector (VAFC) and the VESA media channel (VMC). A third standard has been proposed by Intel and ATI referred to as the shared frame buffer interconnect (SFBI).

The VAFC standard is a 32 bit replacement for prior 8 bit VGA connectors which supports video at much higher resolutions and in better color. The VMC standard also offers a 32 data path and supports up to 15 video streams simultaneously. The VMC standard comprises a dedicated channel for real-time video, and peripherals can communicate independently without slowing the system CPU. The VMC standard also decouples the memory subsystem from the video transfer specification, allowing graphics board manufacturers to offer a variety of boards with differing types of graphics memory.

The SFBI standard combines frame buffers and memory use by each multimedia system into a single shared memory pool. The SFBI standard also includes a protocol for arbitrating among devices attempting to access the memory. However, one drawback to this standard is that the standard is designed to maintain all of the components on a single board. The SFBI standard does not provide an external feature connector unless SFBI cards are connected to another over the host bus. In addition, SFBI cards can include a VMC or VAFC connector for connecting to a VMC or VAFC card.

SUMMARY OF THE INVENTION

The present invention comprises a computer system and method optimized for real-time applications which provides increased performance over current computer architectures. The system preferably includes a standard local expansion bus or system bus, such as the PCI bus, and also includes a dedicated real-time bus or multimedia bus. Thus multimedia devices, such as video devices, audio devices, etc., as well as communications devices, transfer real-time data through a separate bus without requiring arbitration for or usage of the PCI bus. The computer system of the present invention thus provides much greater performance for real-time applications than prior systems. In an alternate embodiment, the computer system only includes one or more dedicated real-time buses which replace the PCI bus.

In the preferred embodiment, the computer system comprises a CPU coupled through chip set or bridge logic to main memory. The bridge logic couples to a local bus such as the PCI bus. The computer system also includes a real-time expansion bus or multimedia bus for transferring real-time or multimedia data. A plurality of multimedia devices, such video devices, audio devices, MPEG encoders and/or decoders, and/or communications devices, are coupled to each of the PCI bus and the multimedia bus. In one embodiment, the multimedia bus transfers only periodic stream data, such as audio data at 44,100 samples per second, video data at 30 frames per second, or real-time communication streams at rates dependent on the transport media.

The computer system preferably includes a plurality of PCI expansion bus connector slots connected to the PCI bus for receiving add-in devices, and also preferably comprises one or more multimedia bus connector slots corresponding to respective ones of the PCI expansion bus connector slots. Thus, in one embodiment, the PCI bus and the multimedia bus are comprised on the motherboard and include respective connector slots for receiving add-in cards. Multimedia device expansion cards each include two connectors which correspond to the PCI bus and the multimedia bus. Alternatively, the multimedia devices are comprised directly on the motherboard and connect directly to the PCI bus and the multimedia bus, and connector slots are not used.

In one embodiment, the multimedia bus comprises primarily or only data lines. In this embodiment, control information for the periodic stream transfers is transferred on the PCI bus by a sourcing device, or is transferred by the CPU to the bridge logic. Thus multimedia data transfers initially involve the transfer of control or setup information on the PCI bus, or transfer of control or setup information by the CPU, to set up the transfer. This transfer of control information is followed by the transfer of the periodic data streams on the multimedia bus. Alternatively, once control/setup information has been used to set up the transfer, the periodic data stream may occupy both the PCI data lines and the multimedia bus for increased data throughput. In this embodiment, the transferring or source device transfers a multiple bus transfer request which requests simultaneous transfers on both the PCI bus and the multimedia bus. If the multiple bus transfer request is accepted, then the source device transfers data on both the PCI bus and the multimedia bus.

The present invention further includes an improved method for transferring periodic data streams on a bus in the computer system, such as periodic video streams or periodic audio streams. According to this method, the transferring device first transmits addressing and control information to set up the transfer. The transferring device then transmits a periodic transfer data request to the receiving device. The periodic transfer data request includes information regarding the frequency and amount of the periodic transfers. The receiving device determines if it can guarantee availability at the periodic time frequencies requested by the transferring device. If the receiving device indicates availability for the periodic transfers, the transferring device sets a periodic transfer flag. The transferring device then performs the periodic transfers to the receiving device at the specified time frequency. If the receiving device does not indicate availability for the periodic transfers, the transferring device performs only a single transfer and is required to transfer control information at the beginning of each subsequent periodic transfer.

In a second embodiment, the computer system includes a dedicated control channel separate from the PCI bus and the multimedia bus for transferring control information for multimedia bus data transfers. The control channel is preferably a serial bus. Alternatively, the control channel is a 4-bit, 8-bit or 16-bit bus. Thus a multimedia data transfer initially involves the transfer of control information on the dedicated control channel followed by the transfer of the periodic data streams on the multimedia bus.

In a third embodiment, the multimedia bus comprises separate channels for different data types. In the preferred embodiment, the computer system includes a first video data channel for transferring video and/or graphics information, a second audio channel for transferring audio information, and optionally a third channel for transferring communications information. The video channel is preferably 32 bits, 24 bits, or 16 bits. Alternatively, the video channel is an 8-bit bus or a very high speed serial bus. The audio channel is preferably 16 bits or 8 bits. Alternatively, the audio channel is also a 32-bit bus or a very high speed serial bus. The communications channel is also preferably either 16 or 8 bits. This third embodiment may use the PCI bus for control information transfers, or may use a separate control channel separate from the PCI bus and the multimedia bus for transferring control information for the periodic stream transfers.

In a fourth embodiment, each multimedia device has a high speed link directly to system memory, which is preferably single or multiple ported memory. These individual links are preferably high speed serial interconnects but, alternatively, may be 4-bit, 8-bit, 16-bit, 24-bit, 32-bit, 64-bit or any combination thereof In this embodiment, intelligent buffering is preferably implemented within the core logic, and arbitration for access to main memory is preferably implemented within the core logic. Each of the multimedia devices uses its dedicated memory data channel to perform data accesses and transfers directly to the main memory, bypassing PCI bus arbitration and PCI bus cycles. Alternatively, each of the multimedia devices includes a high speed memory channel directly to the memory controller in the core logic for accessing system memory.

In a fifth embodiment, the multimedia bus is time sliced wherein time slices or time slots are allocated in proportion to the required bandwidth. In one embodiment, the time slices are each a constant size and a number of the equal sized time slots are allocated to respective data streams in proportion to the required bandwidth. In this embodiment, for example, video data streams may be allocated more time slots than audio data streams because of the increased data transfer band width requirements of video streams. Alternatively, the time slots are not equally sized, but rather are dynamically sized or allocated to data streams in proportion to the required bandwidth.

In a sixth embodiment, multimedia devices that connect to the multimedia bus include intelligent controller circuitry which includes knowledge of the respective time slice allocated to the multimedia device. In this embodiment, arbitration for the multimedia bus is not required. Rather, a multimedia device which is a transmitter of video data monitors the bus and includes controller circuitry which begins transmitting the video data when the device's respective time slot occurs. A corresponding receiver device also knows that the current time slot is a video time slot and monitors the bus to receive the data.

In this embodiment, the interface circuitry of each of the multimedia devices are programmed at boot time for a static allocation of time slots. Alternatively, the interface circuitry in the multimedia devices is dynamically programmed by a central controller dependent upon the mix of real-time processes and applications and the corresponding data transfer bandwidth requirements. For example, the CPU may program each of the multimedia devices with a respective time slot at power-on. Alternatively, the CPU dynamically or heuristically allocates time slot based on bandwidth requirements.

In one embodiment of the invention, the computer system includes a centralized multimedia I/O processor which operates to direct or "pull" data stream information through the system. The multimedia I/O processor is programmed with knowledge of the various data rates, data periodicity, data sources and destinations, and coordinates all transfers within the system. Thus, the multimedia V/O processor creates connections between two or more devices and sets up transfers between devices. The centralized multimedia I/O processor of the present invention may be used exclusively in the multimedia bus or may be used on a standard PCI bus.

In one embodiment, the centralized multimedia I/O processor byte slices the multimedia bus to allow different data streams to use different byte channels simultaneously. Thus the byte sliced multimedia bus allows different peripherals to share the bus simultaneously. The centralized multimedia I/O processor thus may assign one data stream to a subset of the total byte lanes on the multimedia bus, and fill the unused byte lanes with another data stream. For example, with a 32-bit multimedia bus, if an audio data stream is only 16 bits wide and thus only uses half of the multimedia data bus, the multimedia bus intelligently allows data stream transfers on the unused bits of the bus. In this embodiment, the centralized multimedia I/O processor includes knowledge of the destinations and allows transfers to occur without addressing information.

In one embodiment of the invention, the computer system includes a multimedia memory coupled to each of the PCI local expansion bus and the real-time bus. One or more multimedia devices may be coupled to the PCI local expansion bus and the real-time bus. Each of these devices accesses the multimedia memory to retrieve necessary code and data to perform respective operations. The multimedia devices preferably include an arbitration protocol for accessing the multimedia memory using the real-time bus.

In one embodiment, the system bus (preferably PCI) implements a new mode of operation specifically for real-time transfers. A signal (or signals) is used to indicate that the system bus should be placed in a special real time mode. When not in special real time mode, the system bus operates as usual. The real time mode is optimized for the transfer of high bandwidth real-time information.

Therefore, the present invention comprises a novel computer system architecture and method which provides one or more real-time or multimedia buses, optionally with a local expansion bus, to increase the performance of real-time peripherals and applications. The multimedia bus of the present invention provides improved data transfers performance and throughput for real-time devices. The various embodiments discussed above may be combined in various ways for optimum real-time and/or multimedia performance.

BRIEF DESCRIPTION OF THE DRAWINGS

A better understanding of the present invention can be obtained when the following detailed description of the preferred embodiment is considered in conjunction with the following drawings, in which:

FIG. 12 illustrates various time slotting techniques;

DETAILED DESCRIPTION OF THE PREFERRED EMBODIMENT

Incorporation by Reference

*PCI System Architecture* by Tom Shanley and Don Anderson and available from Mindshare Press, 2202 Buttercup Dr., Richardson, TX 75082 (214) 231–2216, is hereby incorporated by reference in its entirety.

The Intel Peripherals Handbook, 1994 and 1995 editions, available from Intel Corporation, are hereby incorporated by reference in their entirety. Also, data sheets on the Intel 82430FX PCIset chipset, also referred to as the Triton chipset, are hereby incorporated by reference in their entirety, including the 82430 Cache Memory Subsystem data sheet (Order No. 290482-004), the 82420/82430 PCIset ISA and EISA bridge data sheet (Order No. 290483-004), and the Intel 82430FX PCIset Product Brief (Order No. 297559-001), all of which are available from Intel Corporation, Literature Sales, P.O. Box 7641, Mt. Prospect, Ill. 60056-7641 (1-800-879-4683), and all of which are hereby incorporated by reference in their entirety.

The Video Electronics Standards Association (VESA) VESA advanced feature connector (VAFC) specification and the VESA media channel (VMC) specification are hereby incorporated by reference in their entirety.

The Intel-ATI shared frame buffer interconnect (SFBI) specification is also hereby incorporated by reference in its entirety.

The PCI Multimedia Design Guide Revision 1.0, dated Mar. 29, 1994, as well as later revisions, are hereby incorporated by reference in their entirety.

Computer System Block Diagram

Figure 1:
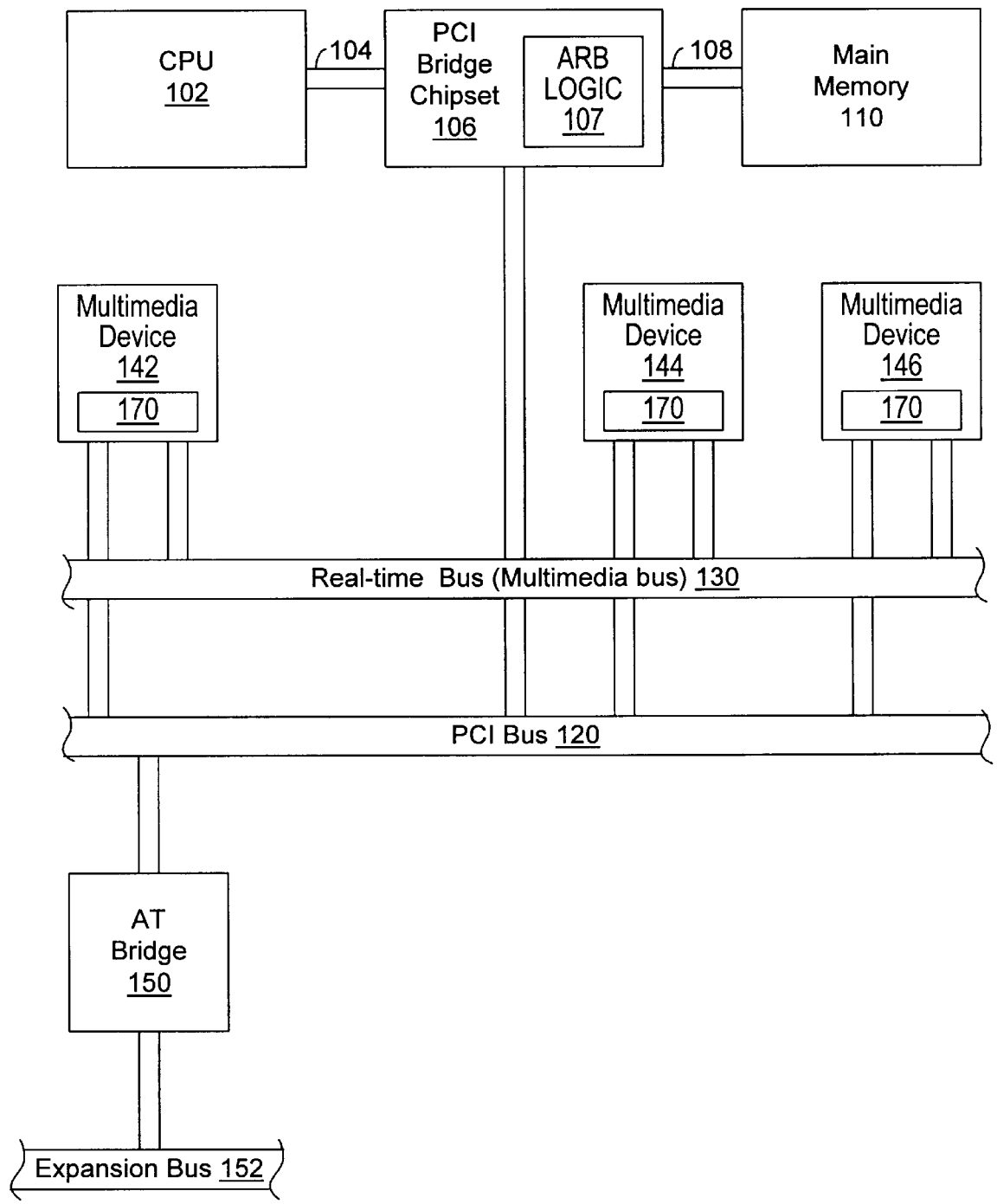
FIG. 1 is a block diagram of a computer system including a local expansion bus and a real-time bus or multimedia bus according to the present invention.

Referring now to FIG. 1, a block diagram of a computer system according to the present invention is shown. As shown, the computer system includes a central processing unit (CPU) 102 which is coupled through a CPU local bus 104 to a host/PCI/cache bridge or chipset 106. The chipset 106 includes various bridge logic and includes arbitration logic 107. The chipset 106 is preferably similar to the Triton chipset available from Intel Corporation, including certain arbiter modifications to accommodate the real-time bus of the present invention. A second level or L2 cache memory (not shown) may be coupled to a cache controller in the chipset 106, as desired. The bridge or chipset 106 couples through a memory bus 108 to main memory 110. The main memory 110 is preferably DRAM (dynamic random access memory) or EDO (extended data out) memory, or other types of memory, as desired.

The chipset logic 106 preferably includes a memory controller for interfacing to the main memory 110 and also includes the arbitration logic 107. The chipset logic 106 preferably includes various peripherals, including an interrupt system, a real time clock (RTC) and timers, a direct memory access (DMA) system, and ROM/Flash memory (all not shown). Other peripherals (not shown) are preferably comprised in the chipset 106, including communications ports, diagnostics ports, command/status registers, and non-volatile static random access memory (NVSRAM.

The host/PCI/cache bridge or chipset 106 also interfaces to a local expansion bus or system bus 120. In the preferred embodiment, the local expansion bus 120 is the peripheral component interconnect PCI) bus 120. However, it is noted that other local buses may be used, such as the VESA (Video Electronics Standards Association) VL bus. Various types of devices may be connected to the PCI bus 120.

The computer system shown in FIG. 1 also includes a real-time bus, also referred to as a multimedia bus 130. The multimedia bus 130 preferably includes a 32 or 64 bit data path and may also include address and control portions.

One or more multimedia devices or multimedia devices 142, 144, and 146 are coupled to each of the PCI bus 120 and the multimedia bus 130. One or more multimedia devices may connect to the PCI bus 120 only. The multimedia devices 142–146 include interface circuitry 170 which includes standard PCI interface circuitry for communicating on the PCI bus 120. For devices which also connect to the multimedia bus, the interface circuitry 170 in the multimedia devices 142–146 also includes interface logic for interfacing to the multimedia bus 130. The multimedia devices 142–146 use the multimedia bus 130 to communicate data, preferably only periodic data, between the respective devices.

The multimedia devices 142–146 may be any of various types of input/output devices, including multimedia devices and communication devices. For example, the multimedia devices 142–146 may comprise video accelerator or graphics accelerator devices, video playback devices, MPEG encoder or decoder devices, sound devices, network interface devices, SCSI adapters for interfacing to various input/output devices, such as CD-ROMS and tape drives, or other devices as desired.

Thus, the multimedia devices 142–146 communicate with each other via the PCI bus 120 and also communicate with the CPU and main memory 110 via the PCI bus 120, as is well known in the art. The multimedia devices 142–146 also communicate data between each other using the real-time bus or multimedia bus 130. When the multimedia devices 142–146 communicate using the real-time bus 130, the devices are not required to obtain PCI bus mastership and they consume little or no PCI bus cycles.

Expansion bus bridge logic 150 may also be coupled to the PCI bus 120. The expansion bus bridge logic 150 interfaces to an expansion bus 152. The expansion bus 152 may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, such as expansion bus memory or a modem (both not shown).

Multimedia Devices

Figure 2:
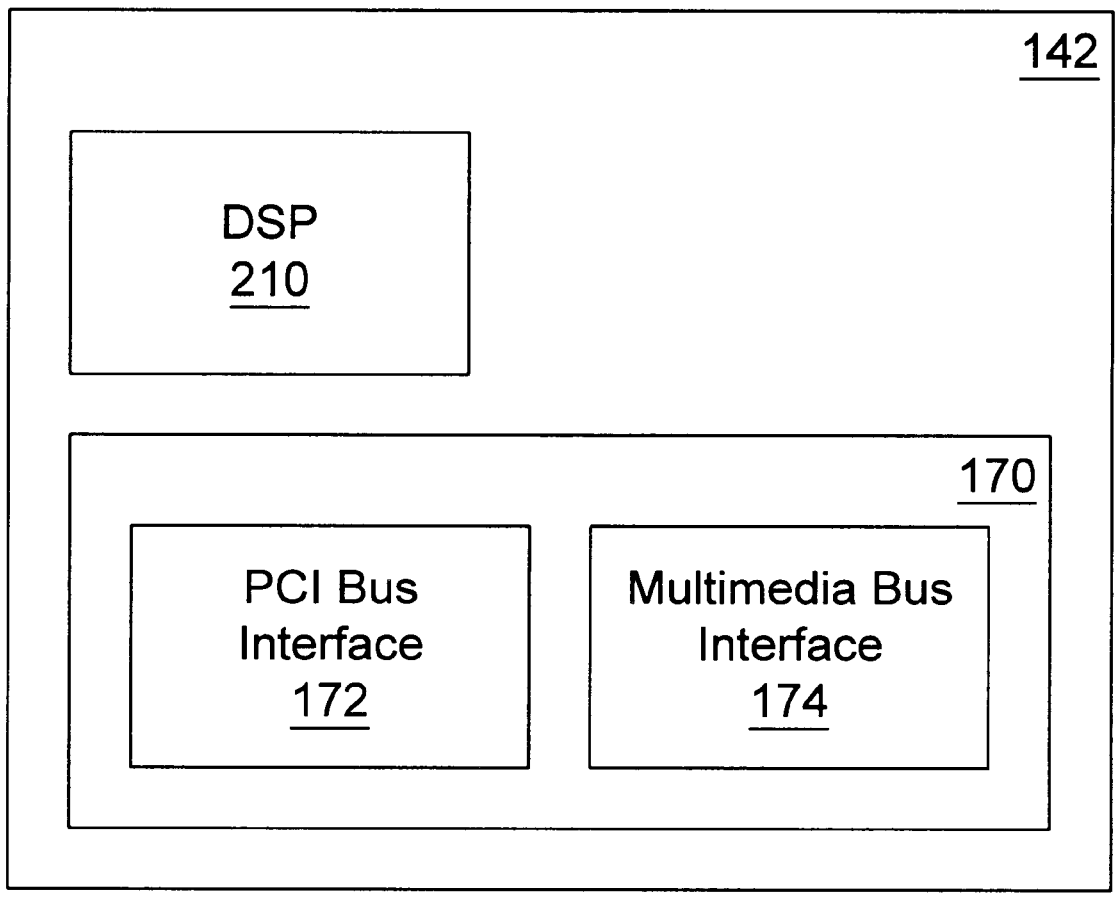
FIG. 2 is a block diagram of a multimedia device in the computer system of FIG. 1.

Referring now to FIG. 2, a block diagram is shown illustrating one of the multimedia devices 142–146, such as multimedia device 142. As shown, the multimedia device 142 includes interface logic 170 comprising PCI interface circuitry 172 for communicating on the PCI bus 120 and also including multimedia bus interface logic 174 for interfacing to the multimedia bus 130. The multimedia device 142 also may include a digital signal processor (DSP) 210 or other hardware circuitry for implementing a multimedia or communications function. Each of the multimedia devices 142–146 preferably includes the interface logic 170, as shown in FIG. 2.

The multimedia devices 142–146 preferably use the multimedia or real-time bus 130 only for high speed data transfers of real-time stream data information. In one embodiment the multimedia bus 130 transfers only periodic stream data, i.e., data streams which require periodic transfers for multimedia or communication purposes. Examples of periodic data include audio data, which is typically transmitted at 44,100 samples per second, video data, which is typically transmitted at 30 frames per second, or real-time communication streams at rates dependent on the transport media. In an alternate embodiment, the multimedia bus 130 is used for any of various types of multimedia or communications data transfers, including both periodic and a periodic data.

In the embodiment shown in FIG. 1, the multimedia bus 130 includes primarily or only data lines, such as a 32 bit or 64 bit data path, and does not include address or arbitration portions. As discussed above with reference to FIG. 2, the multimedia devices 142–146 each include interface logic 170 which includes PCI interface logic 172 and which also includes multimedia bus interface logic 174. In one embodiment of the invention, the interface logic 170 in each of the multimedia devices 142–146 uses the PCI bus 120 for addressing and control for transfers on the multimedia bus 130. Thus the multimedia devices 142–146 use the multimedia or real-time bus 130 only for high speed data transfers. Thus, in this embodiment, the multimedia bus interface logic 174 includes only data signal pins for interfacing to the data lines comprising the multimedia bus 130.

Figure 3A:
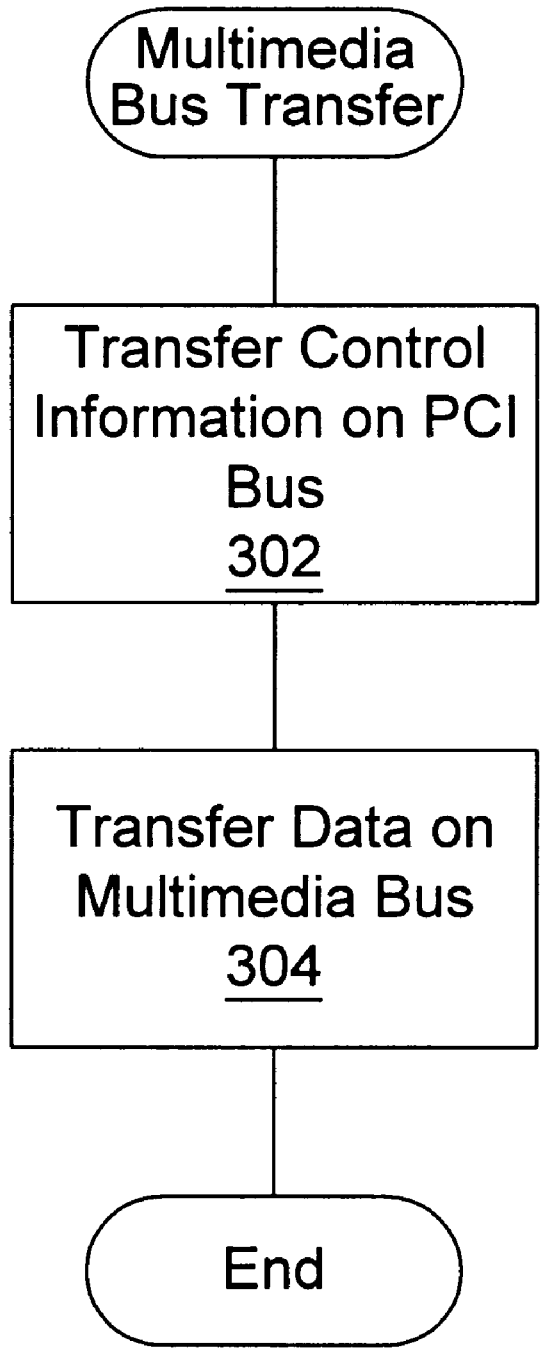
FIG. 3A is a flowchart diagram illustrating a multimedia bus transfer which uses the PCI bus for control and addressing information.

FIG. 3A—Flowchart Diagram

Referring now to FIG. 3A, a flowchart diagram illustrating operation of a multimedia data transfer according to this embodiment of the present invention is shown. When a multimedia device such as device 142 desires to perform a transfer, in step 302 the PCI interface logic 172 in the transferring device transfers control information on the PCI bus 120 to set up the transfer. This involves providing an address indicating the destination address of the transfer as well as control and status information regarding the length of the transfer, among other status information. The transferring device provides the control information to the respective destination device.

Thus the transferring device essentially acts as a PCI bus master in setting up the multimedia transfer. The transferring device also preferably provides a special multimedia transfer flag or data byte to the receiving device which informs the receiving device that the upcoming transfer is not a PCI bus transfer, but rather is a multimedia bus transfer. It is noted that the transferring device may first be required to arbitrate for control of the PCI bus 120. Once the transfer has been set up on the PCI bus 120 in step 302, then in step 304 the transferring device performs the data transfer on the multimedia bus 130 to the receiving or target device. Also, once the transfer has been set up on the PCI bus 120 in step 302, then the PCI bus 120 is free for other types of transfers.

Alternatively, the CPU 102 initiates the transfer by providing transfer information to the chipset 106. The chipset 106 then either directs the transfer or provides the transfer information to the save and distortion devices.

Figure 3B:
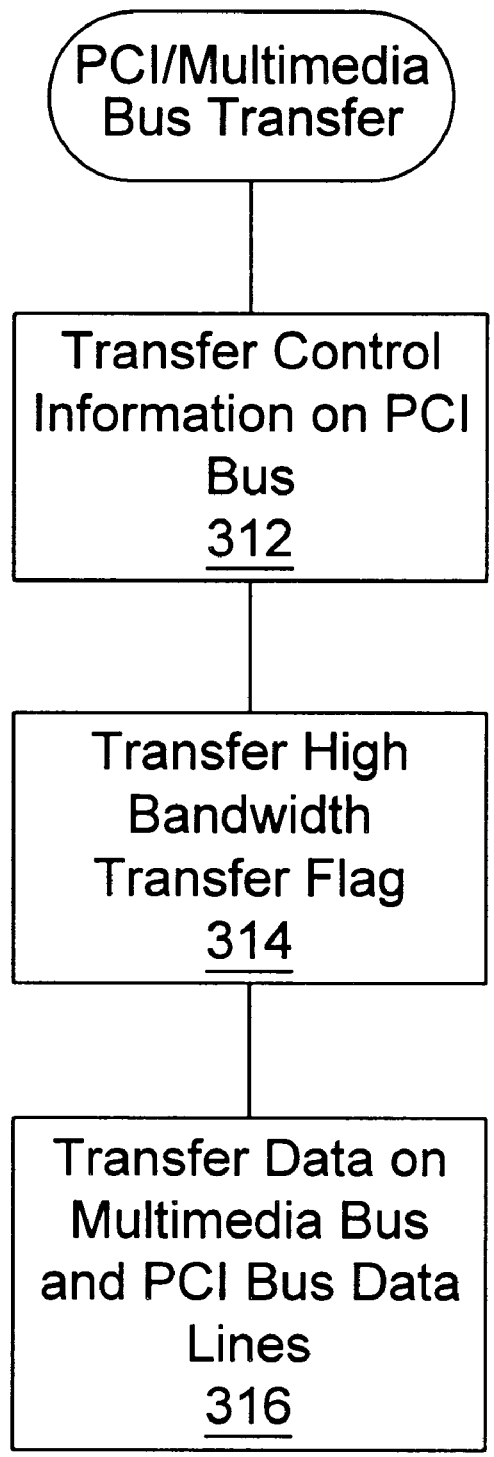
FIG. 3B is a flowchart diagram illustrating a multimedia bus transfer which uses both the PCI bus data lines and the multimedia bus data lines for improved bandwidth.

FIG. 3B—PCI/Multimedia Bus Transfer

Referring now to FIG. 3B, in one embodiment the transferring device may also provide a high bandwidth PCI I multimedia transfer flag or data byte to the receiving device which informs the receiving device that the upcoming transfer will occupy the data lines of both the PCI bus and the multimedia bus simultaneously. This type of transfer is preferably reserved for very high bandwidth transfers, such as full-screen, fill motion video at 30 frames per second.

As shown, when a multimedia device such as device 142 desires to perform a transfer using both the PCI bus data lines and the multimedia bus data lines simultaneously, in step 312 the PCI interface logic 172 in the transferring device transfers control information on the PCI bus 120 to the respective destination device to set up the transfer. This involves providing an address indicating the destination address of the transfer as well as control and status information regarding the length of the transfer, among other status information.

In step 314 the transferring device provides a high bandwidth transfer flag on the PCI bus 120 to the respective destination device indicating that a dual bus transfer is desired. In other words, the high bandwidth PCI/multimedia transfer flag indicates that the upcoming transfer will occupy the data lines of both the PCI bus 120 and the multimedia bus 130. In step 316 the transferring device performs the data transfer on the data lines of both the PCI bus 120 and the multimedia bus 130. The transferring device preferably provides separate data blocks on each bus's data lines to allow the target device to properly collate the data.

Figure 3C:
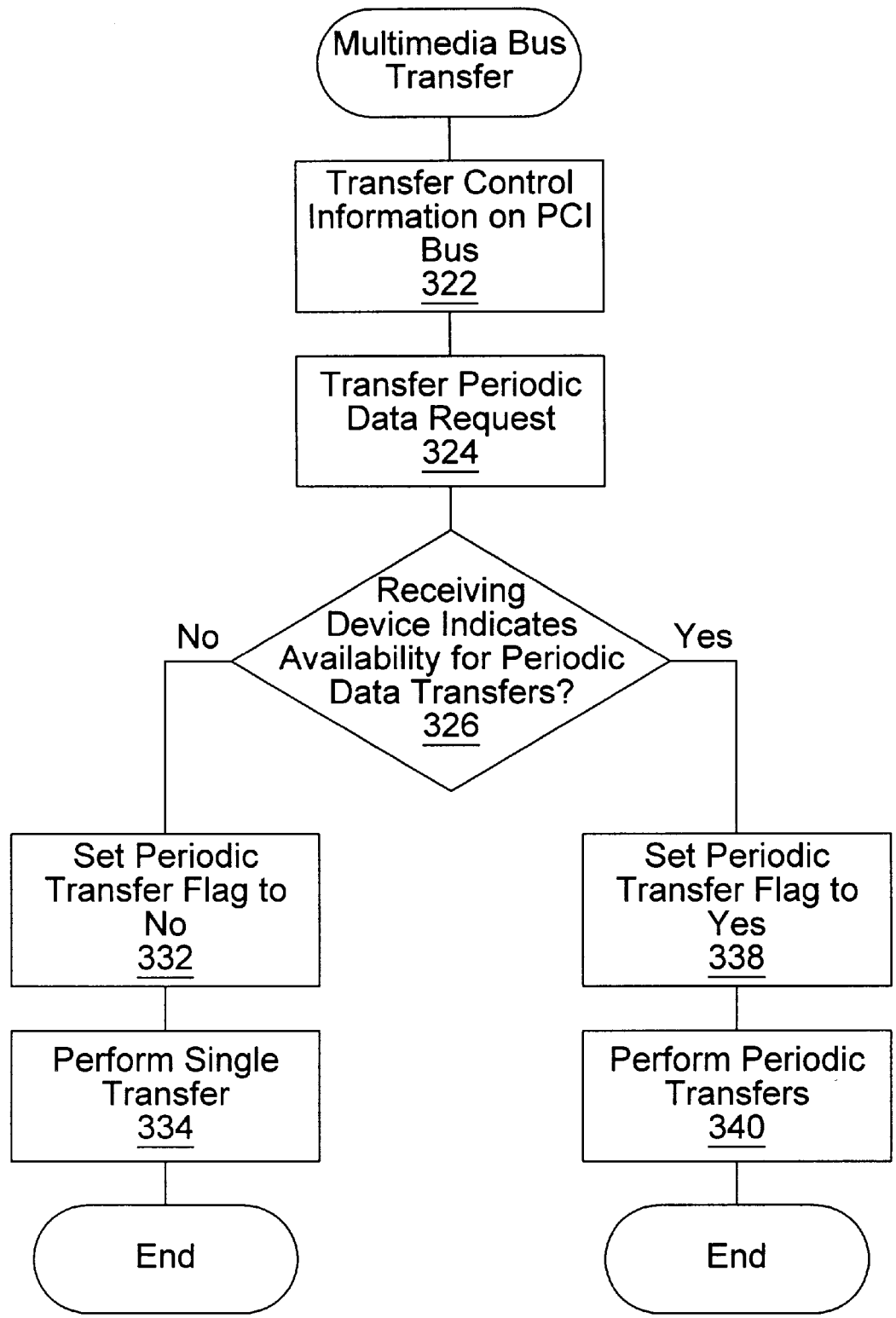
FIG. 3C is a flowchart diagram illustrating a multimedia bus transfer optimized for periodic data transfers.

FIG. 3C—Periodic Data Transfers

Referring now to FIG. 3C, a flowchart diagram illustrating a data transfer method optimized for periodic transfers is shown. This method minimizes the amount of addressing and control information required to be transferred by essentially using preset periodic burst transfers for the periodic data. In this disclosure, the term "periodic data" refers to data streams which require transfers with a known periodicity and are typical of multimedia or communication processes. Examples of periodic data include audio data, which is typically transmitted at 44,100 samples per second, video data, which is typically transmitted at 30 frames per second, or real-time communication streams at rates dependent on the transport media. Periodic data can be buffered and transmitted in a burst, but the burst still has a known periodicity, e.g. where 100 audio samples are stored before a burst transfer, this results in a burst rate of 441 transfers per second.

As shown, if a multimedia device such as device 142 desires to transfer periodic data streams on the multimedia bus 130, in step 322 the PCI interface logic 172 in the multimedia device 142 first transfers control information on the PCI bus 120 to the receiving or target device. As noted above, the control information comprises a destination address of the transfer, information regarding the length of the transfer and other status information.

In step 324 the transferring device provides a periodic data transfer request to the receiving device or target device. This periodic data transfer request comprises a request for the multimedia device acting as the transmitter to periodically transfer a data stream to the receiving device at a predetermined frequency without requiring each individual transfer to be set up with control and addressing information. This periodic data request is used for periodic data, such as audio data, which is periodically transferred corresponding to an audio sampling rate typically of 44, 100 samples per second, or for motion video transfers, which require a frame buffer transfer of 30 frames per second.

The periodic transfer request includes periodicity data indicating the period or frequency at which the device 142 is required to transfer the data, i.e., the frequency at which the device will be transferring the data. The periodic data transfer request also includes information regarding the approximate amount of data involved in the periodic transfers as well as any real-time constraint information.

In response to the transferring device transferring the periodic transfer request in step 324, the receiving device uses the received information to determine if it can guarantee availability at the requested time frequency to receive the data. If the receiving device can guarantee availability for receiving this periodic data, then the receiving device preferably performs a handshake to indicate that the periodic data transfers can be performed. The receiving device also preferably configures one or more timers or counters at the specified frequency to indicate when the receiving device should enable its buffers and transceivers to receive the periodic data on the bus.

In step 326, the transmitting multimedia device determines if the receiving device has indicated availability for the periodic transfer. Thus, when the receiving device receives the periodic data transfer request in step 324, the receiving device determines if the receiving device can guarantee a certain bandwidth and availability at the designated time indicated by the periodic data transfer request. If the receiving device cannot guarantee availability at the frequency or period specified by the periodic data transfer request, then the receiving device indicates that it is not available for periodic data transfers. In this case, in step 332 the transmitting multimedia device sets the periodic transfer flag to no and in step 334 performs a single transfer. In this instance, each future transfer of the periodic data requires that step 322 be performed to transfer control and addressing information to the receiving device to set up the transfer.

If the receiving device indicates availability for the periodic data transfer in step 326, then in step 338 the transmitting multimedia device sets the periodic transfer flag to yes and in step 340 the transferring device begins the first of a plurality of periodic transfers at the frequency or period specified in the periodic data transfer request in step 324. If the multimedia device 142 has indicated a desire to transfer periodic data streams on the multimedia bus 130, and the receiving device has indicated availability to perform the transfers, then multimedia device 142 performs periodic transfers of data streams to the receiving device. In this instance, the receiving device has indicated that it can guarantee availability at the times required by the transmitting device. Thus the receiving is available to receive each transfer of periodic data.

FIG. 4—Motherboard

Figure 4:
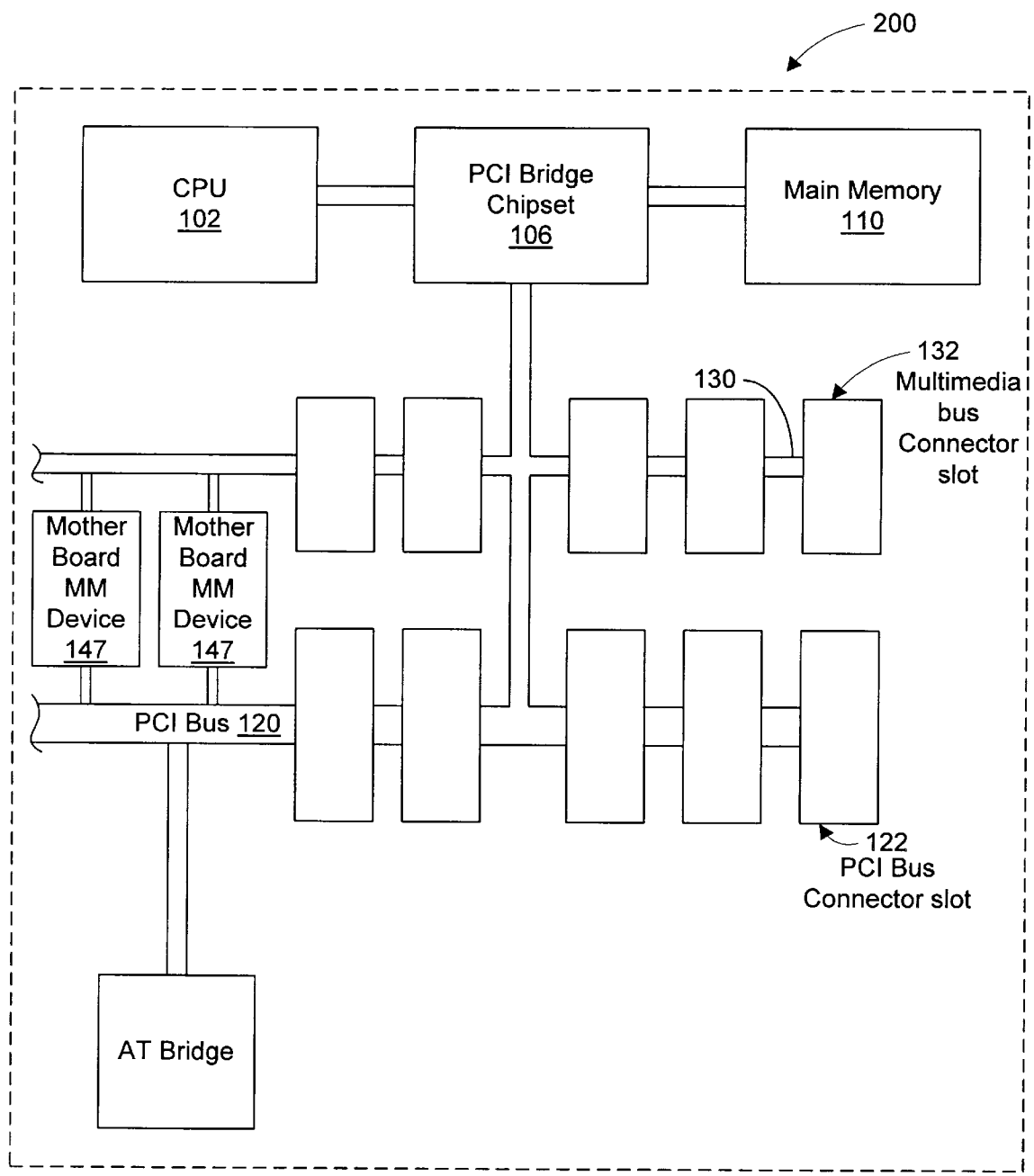
FIG. 4 is a block diagram of the motherboard of the computer system of FIG. 1.

Referring now to FIG. 4, a block diagram of motherboard 200 of the computer system of FIG. 1 is shown. As shown, the various devices and buses are preferably comprised on the motherboard 200. The motherboard 200 comprises the CPU 102, the chipset logic 106, the main memory 110, the PCI bus 120, and the real-time or multimedia bus 130.

The motherboard 200 also includes a plurality of PCI bus connector slots 122 which are electrically connected to the PCI bus 120. The connector slots 122 are adapted for receiving a corresponding or mating edge connector of an expansion card that is adapted for insertion into the PCI connector slots 122. The motherboard 200 also includes one or more multimedia bus connector slots 132 which are adapted to receive corresponding or mating edge connectors of expansion cards.

As shown, each of the multimedia bus connector slots 132 corresponds to a respective one of at least a subset of the PCI bus connector slots 122. In one embodiment, the motherboard 200 includes a first plurality of PCI bus connector slots 122 and a second lesser plurality of multimedia bus connector slots 132. In another embodiment, multimedia devices interconnected to both the PCI bus and the multimedia bus are implemented directly on the motherboard or on a separate daughter card.

Figure 5:
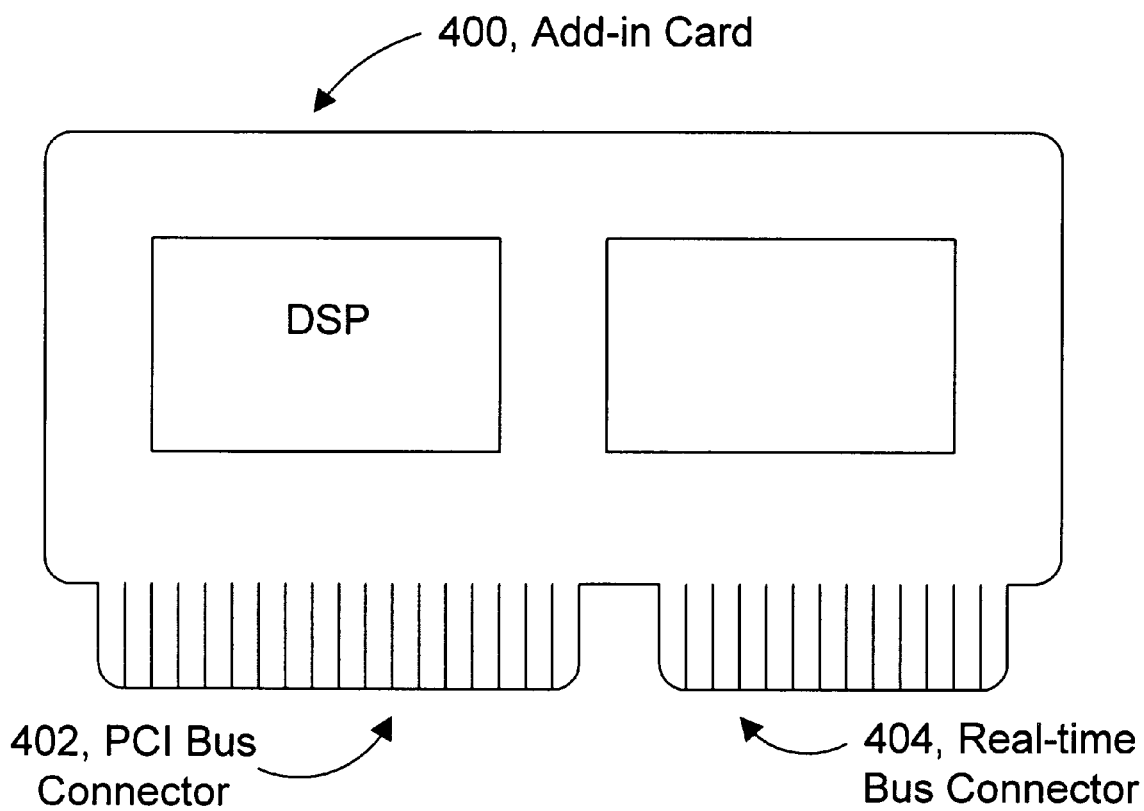
FIG. 5 illustrates a modular add-in card including a local expansion bus connector and a multimedia bus connector according to the present invention.

FIG. 5—Expansion Card

Referring now to FIG. 5, an expansion card or add-in card 400 is shown, which comprises one of the multimedia devices 142–146. Therefore, in one embodiment, one or more of the multimedia devices 142–146 are comprised on modular expansion cards adapted for insertion into respective slots of each of the real-time bus 130 and PCI bus 120.

As shown, a PCI expansion card 400 according to the present invention includes a PCI bus connector 402 which is adapted for insertion into a PCI expansion bus connector slot 122 for electrically coupling to the PCI bus 120. The adapter card 400 also includes a real-time or multimedia bus connector 404 according to the present invention, which is adapted for insertion into connector slot 132 of the real-time bus 130.

Thus, one or more of the multimedia devices 142–146 may be comprised on a modular expansion card 400 including PCI bus connector 402 and multimedia bus connector 404. This configuration allows for more modular and upgradeable expansion options in the computer system. This also provides the benefits of a PCI local expansion bus coupled with a real-time or multimedia bus 130 for additional data bandwidth and multimedia real-time data transfer capabilities.

The multimedia device modular expansion card 400 is also backwards compatible with existing PCI multimedia devices. For example, existing prior art multimedia devices include PCI bus connector 402 but do not include a real-time bus connector 404. These prior art multimedia devices are simply inserted into a respective PCI expansion slot 122, and the corresponding real-time connector slot 132 is not used for that respective PCI expansion slot 122. Thus, the computer system motherboard 200 shown in FIG. 4 may receive prior art multimedia devices or may receive new expansion cards 400 according to the present invention which include both a PCI bus connector 402 and real-time bus connector 404.

Figure 6:
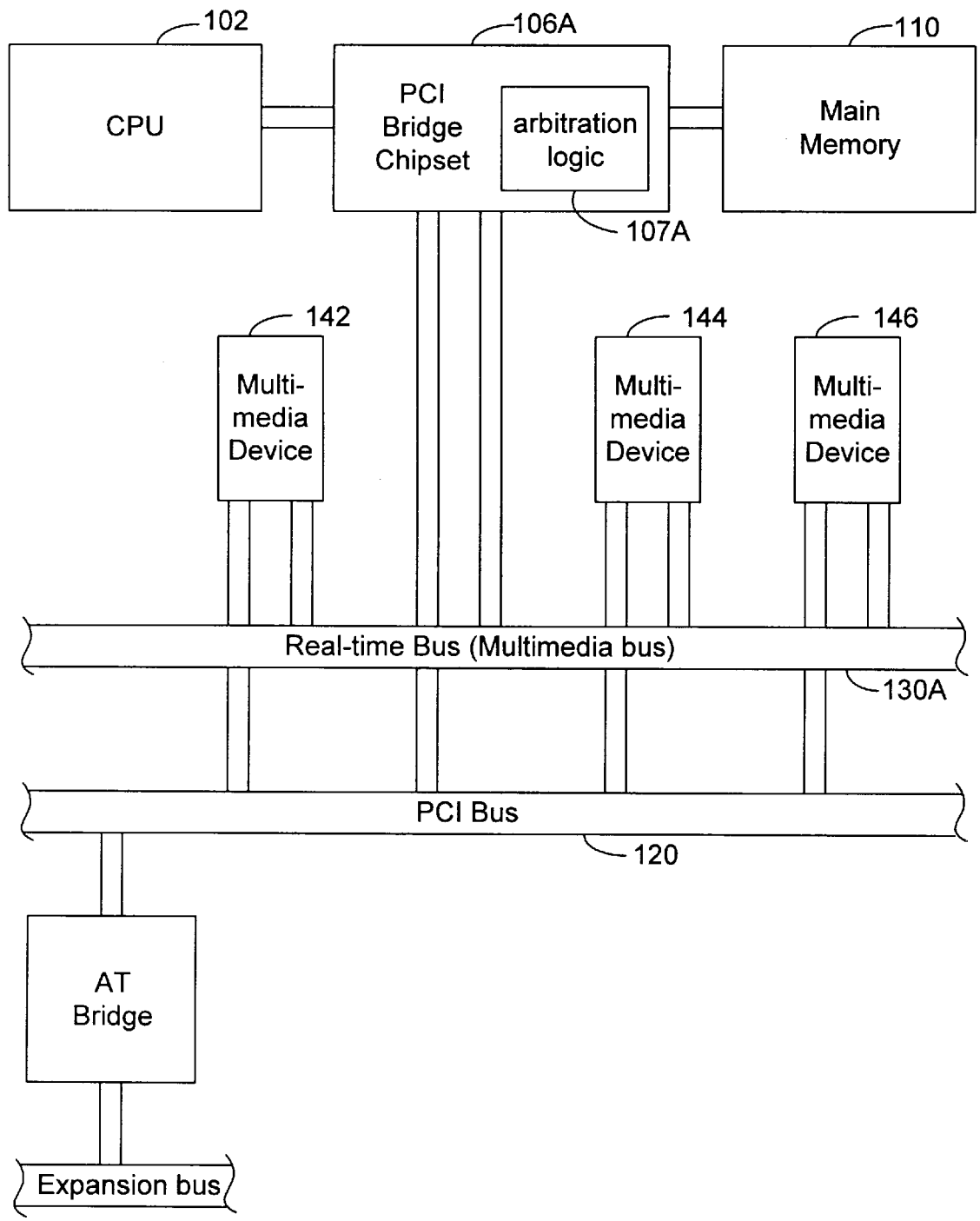
FIG. 6 is a block diagram of an alternate embodiment of the computer system of FIG. 1.

FIG. 6—Alternate Embodiment

Referring now to FIG. 6, an alternate embodiment of the computer system of FIG. 1 is shown. In the embodiment of FIG. 6, chipset logic 106A is connected to both the local expansion bus 120 as well as real-time bus 130A. In this embodiment, the multimedia bus 130A may be different from the multimedia bus 130 shown in FIG. 1 to accommodate CPU accesses through the chipset logic 106A to the real-time bus 130A, and also to accommodate peripheral device accesses through the real-time bus 130A and chipset logic 106A to main memory 110. Also, multimedia devices 142–146 which are coupled to the PCI bus 120 and the real-time bus 130A in FIG. 6 may be different from the multimedia devices 142–146 in FIG. 1 to accommodate accesses through the real-time bus 130A to main memory 110.

Thus, in this embodiment, the chipset logic 106A can communicate directly to the PCI bus 120, and can also communicate directly with the real-time or multimedia bus 130. This facilitates operation of the CPU 102 communicating with the multimedia devices 142–146 through both the PCI bus 120 and the multimedia bus 130A. In addition, one or more of the multimedia devices 142–146 can use the multimedia bus 130A to interface through the chipset logic 106A to the main memory 110 as desired.

Figure 7:
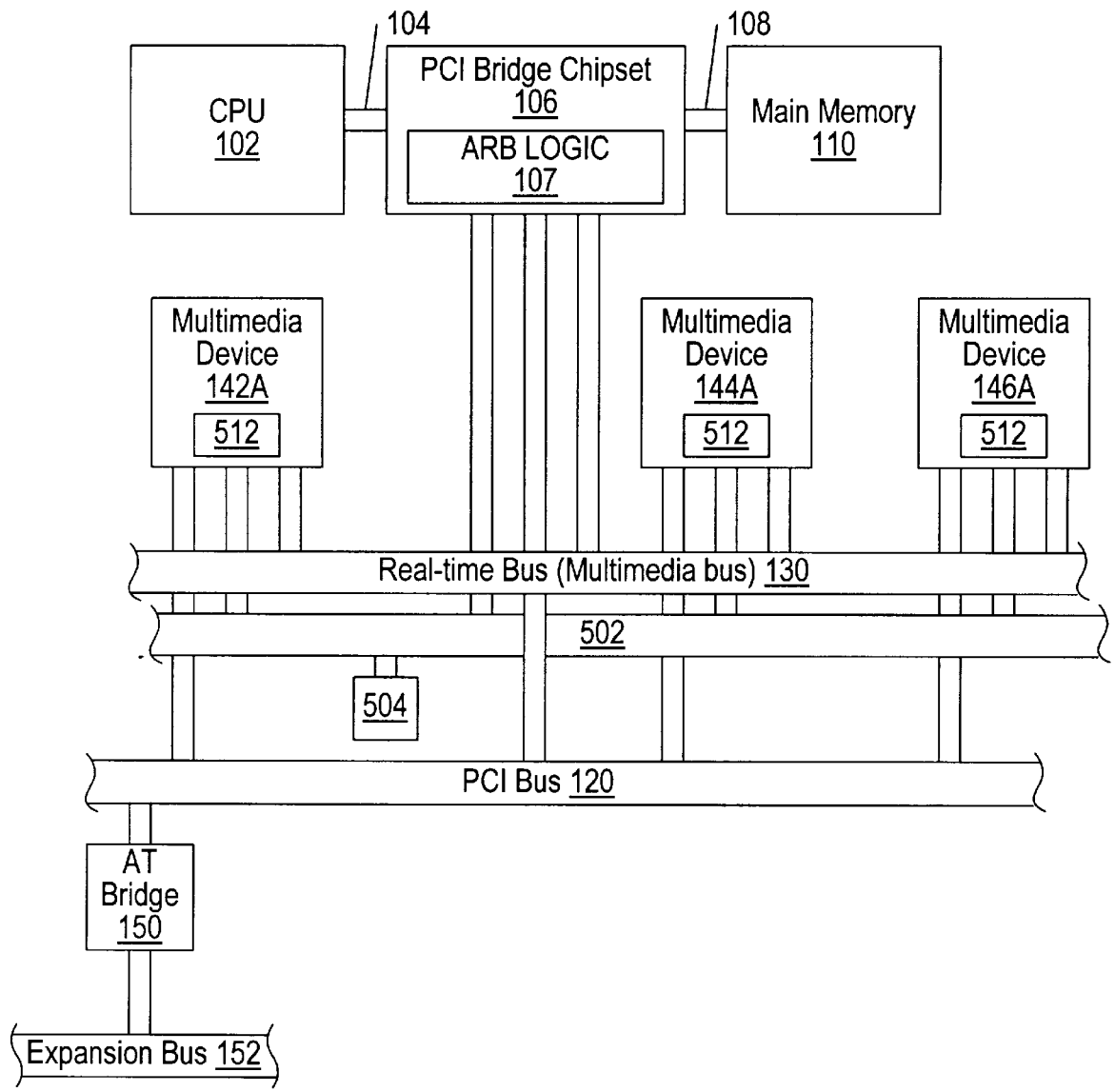
FIG. 7 is a block diagram of a computer system including a local expansion bus and a real-time bus or multimedia bus and also including a dedicated control channel according to an alternate embodiment of the present invention.

FIG. 7—Computer System with Multimedia Bus and Separate Control Channel

Referring now to FIG. 7, a computer system is shown which includes a multimedia bus 130 and a separate control channel 502. The computer system of FIG. 7 is similar to the computer system of FIG. 1. However, the computer system of FIG. 7 includes a separate control channel 502 in addition to the PCI bus 120 and the real-time or multimedia bus 130. As described below, multimedia devices use the multimedia bus 130 for high speed data transfers and use the dedicated control channel for addressing and control for the multimedia bus transfers. In the following description, elements which are preferably identical to elements previously described include the same reference numerals for convenience.

As shown, the computer system includes a central processing unit (CPU) 102 which is coupled through a CPU local bus 104 to a host/PCI/cache bridge or chipset 106. The chipset 106 includes various bridge logic, peripheral logic and arbitration logic 107, as described above with reference to FIG. 1. The bridge or chipset 106 couples through a memory bus 108 to main memory 110. The main memory 110 is preferably DRAM (dynamic random access memory) or EDO (extended data out) memory, or other types of memory, as desired. The chipset logic 106 preferably includes a memory controller for interfacing to the main memory 110.

The host/PCI/cache bridge or chipset 106 interfaces to a local expansion bus or system bus 120. In the preferred embodiment, the local expansion bus 120 is the peripheral component interconnect (PCI) bus 120. However, it is noted that other local buses may be used, such as the VESA (Video Electronics Standards Association) VL bus. Various types of devices may be connected to the PCI bus 120. Expansion bus bridge logic 150 and an expansion bus 152 may also be coupled to the PCI bus 120, as described above.

The computer system shown in FIG. 7 includes a real-time bus, also referred to as a multimedia bus 130. The multimedia bus 130 preferably includes a 32 or 64 bit data path and in this embodiment does not include address and control portions. The computer system shown in FIG. 7 further includes a dedicated control channel 502 separate from the PCI bus 120 and the multimedia bus 130 for transferring control information for multimedia bus data transfers. The control channel 502 is preferably a serial bus such as the Philips I2C serial bus from Philips Corp. Alternatively, the control channel 502 is a 4-bit or 8-bit bus. Thus a multimedia data transfer initially involves the transfer of control information on the dedicated control channel 502 followed by the transfer of data streams, preferably periodic data streams, on the multimedia bus 130. Alternatively, the control channel 502 may be integrated into the multimedia bus 130 as addressing, control and status lines. The control channel 502 may be used to transfer interrupt, synchronization, and status commands and information.

One or more multimedia devices 142A, 144A, and 146A are coupled to each of the PCI bus 120 and the multimedia bus 130. The multimedia devices 142A–146A each include bus interface circuitry 512 which includes standard PCI interface circuitry for communicating on the PCI bus 120, interface logic for interfacing to the multimedia bus 130, and control channel interface logic for interfacing to the control channel 502. The multimedia devices 142A–146A use the multimedia bus 130 to communicate data between the respective devices and use the control channel 502 for addressing and control of the multimedia bus 130.

The multimedia devices 142A–146A may be any of various types of input/output devices, including multimedia devices and communication devices, as described above. The multimedia devices 142A–146A are preferably similar to the multimedia devices 142–146 described above, except that the interface logic 512 in the multimedia devices 142A–146A each include control channel interface logic, as described below. As described above, the multimedia devices 142A–146A may comprise video accelerator or graphics accelerator cards, video playback cards, MPEG decoder cards, sound cards, network interface cards, SCSI adapters for interfacing to various input/output devices, such as CD-ROMS and tape drives, or other devices as desired.

Thus, the multimedia devices 142A–146A communicate with each other via the PCI bus 120 and also communicate with the CPU 102 and main memory 110 via the PCI bus 120, as is well known in the art. The multimedia devices 142A–146A also communicate data between each other using the real-time bus or multimedia bus 130. When the multimedia devices 142A–146A communicate using the real-time bus 130, the devices use the control channel 502 for addressing, control, status and handshaking signals. Thus the devices 142A–146A do not utilize any PCI bus cycles when communicating over the multimedia bus 130.

In the embodiment of FIG. 7, arbitration logic 504 is coupled to the control channel 502 and performs arbitration for the devices 142A–146A on the bus 130. Alternatively, arbitration logic 504 is incorporated into the PCI Bridge Chipset 106. In these embodiments, the multimedia devices 142A–146A provide request signals on the control channel 502 to the arbitration logic 504, and the arbitration logic 504 grants bus access according to a desired arbitration method.

Multimedia Devices

Figure 8:
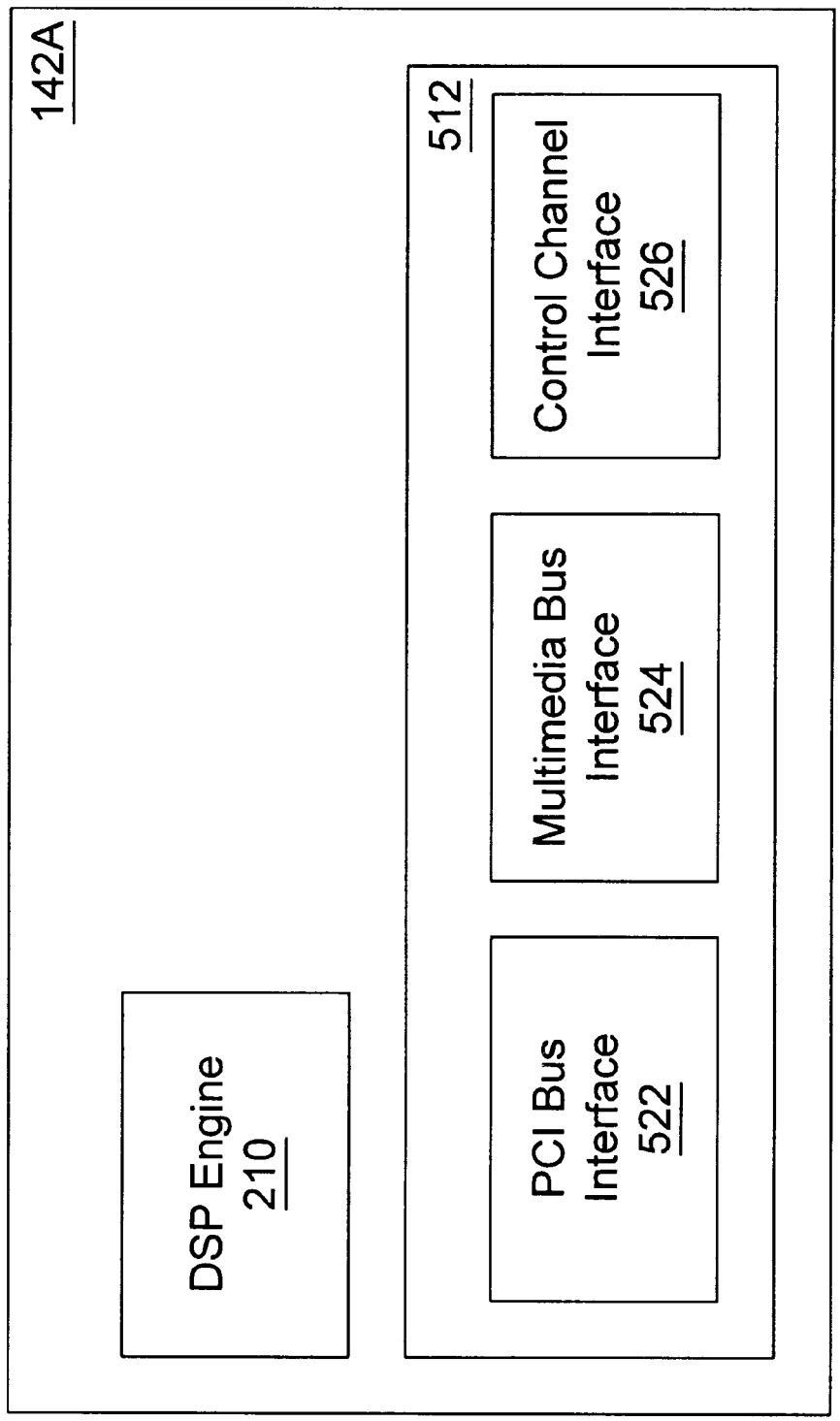
FIG. 8 is a block diagram of a multimedia device in the computer system of FIG. 7.

Referring now to FIG. 8, a block diagram is shown illustrating one of the multimedia devices 142A–146A, such as multimedia device 142A. As shown, the multimedia device 142A includes interface logic 512 comprising PCI interface circuitry 522 for communicating on the PCI bus 120, multimedia bus interface logic 524 for interfacing to the multimedia bus 130, and also including control channel interface logic 526 for interfacing to the control channel 502. The multimedia device 142A also may include a digital signal processor (DSP) 210 or other hardware circuitry for implementing a multimedia or communications function. Each of the multimedia devices 142A–146A preferably includes the interface logic 512, as shown in FIG. 8.

The multimedia devices 142A–146A preferably use the multimedia or real-time bus 130 only for high speed data transfers of real-time stream data information. In one embodiment the multimedia bus 130 transfers only periodic stream data, i.e., data streams which require periodic transfers for multimedia or communication purposes, as described above. Examples of periodic data include audio data, which is typically transmitted at 44,100 samples per second, video data, which is typically transmitted at 30 frames per second, or real-time communication streams at rates dependent on the transport media. In an alternate embodiment, the multimedia bus 130 is used for any of various types of multimedia or communications data transfers, including both periodic and a periodic data.

In the embodiment shown in FIG. 7, the multimedia bus 130 includes primarily data lines, such as a 32 bit or 64 bit data path, and does not include address or arbitration portions.

In this embodiment of the invention, each of the multimedia devices 142A–146A uses the control channel 502 for addressing and control for transfers on the multimedia bus 130. Thus the multimedia devices 142A–146A use the multimedia or real-time bus 130 only for high speed data transfers. Thus, in this embodiment, the multimedia bus interface logic 524 includes only data signal pins for interfacing to the data lines comprising the multimedia bus 130. Also, PCI bus bandwidth is not affected by multimedia bus transfers.

Figure 9A:
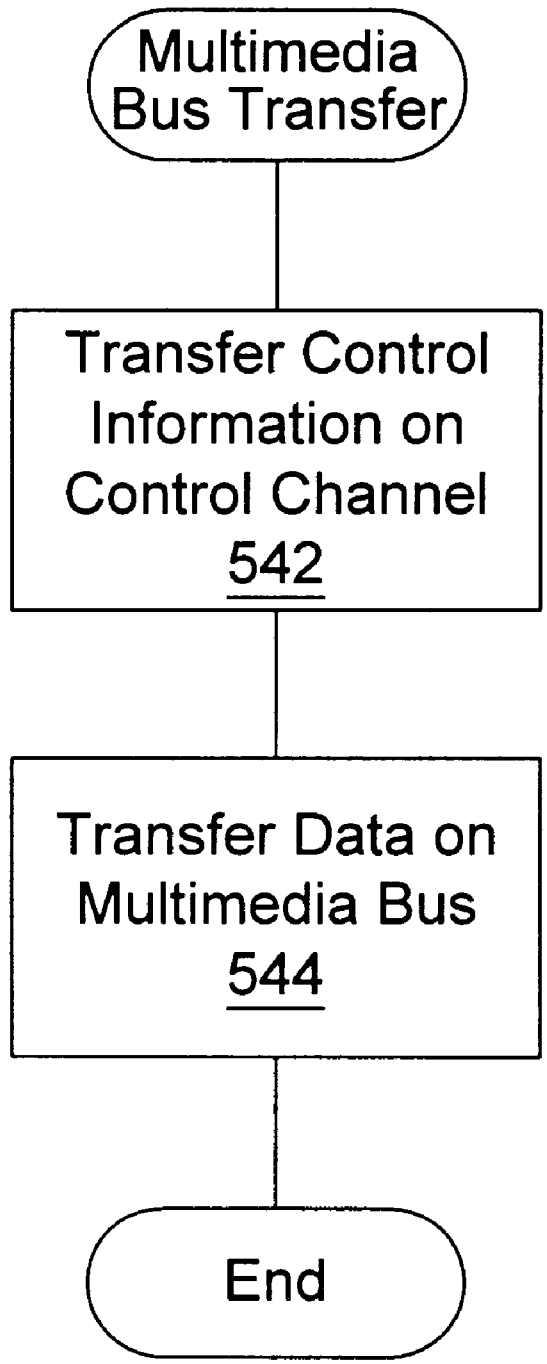
FIGS. 9A and 9B are flowchart diagrams illustrating multimedia bus transfers in the computer system of FIG. 7.

FIG. 9A—Flowchart Diagram

Referring now to FIG. 9A, a flowchart diagram is shown illustrating operation of a multimedia data transfer according to the embodiment of FIG. 7. When a multimedia device 142A desires to perform a transfer, in step 542 the control channel interface logic 526 in the transferring device transfers control information on the control channel 502 to set up the transfer. This involves providing an address indicating the destination address of the transfer as well as control and status information regarding the length of the transfer, among other status information. The transferring device provides the control information to the respective destination device.

Once the transfer has been set up on the control channel 502 in step 542, then in step 544 the transferring device performs the data transfer on the multimedia bus 130 to the receiving or target device. During the entire transfer in steps 542 and 544, the PCI bus 120 is free for other types of transfers.

Figure 9B:
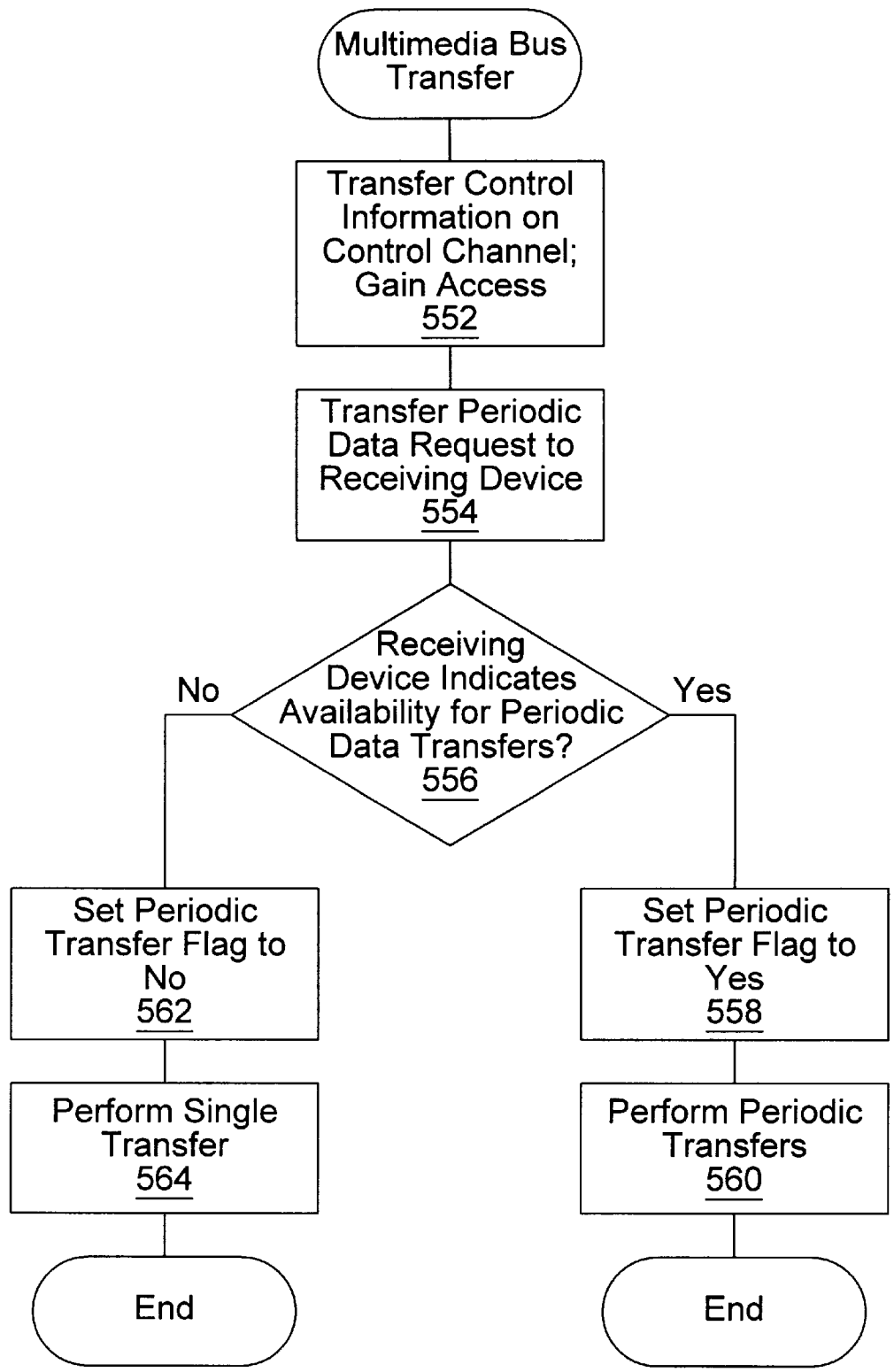

FIG. 9B—Periodic Data Transfers

Referring now to FIG. 9B, a flowchart diagram illustrating a data transfer method optimized for periodic transfers is shown. This method minimizes the amount of addressing and control handshaking and increases performance as described above by essentially using preset periodic burst transfers for the periodic data. In this disclosure, the term "periodic data" refers to data streams which require transfers with a known periodicity and are typical of multimedia or communication processes. Examples of periodic data include audio data, which is typically transmitted at 44,100 samples per second, video data, which is typically transmitted at 30 frames per second, or real-time communication streams at rates dependent on the transport media.

As shown, if the multimedia device 142A desires to transfer periodic data streams on the multimedia bus 130, in step 552 the control channel interface logic 526 in the multimedia device 142 first transfers control information on the control channel 502 to the arbitration logic 504. The control information preferably comprises arbitration information used by the arbitration logic 504 in determining who should receive control of the multimedia bus 130. the control information also includes a destination address of the transfer, information regarding the length of the transfer and other status information.

Once the requesting device has received control of the bus 130, in step 554 the transferring device provides a periodic data transfer request to the target device. This periodic data transfer request may be transferred over the control channel 502 or the multimedia bus 130. As described above, the periodic data transfer request comprises a request for the multimedia device acting as the transmitter to periodically transfer a data stream to the receiving device at a predetermined frequency without requiring each individual transfer to be set up with control and addressing information. This periodic data request is used for periodic data.

The periodic transfer request includes periodicity data indicating the period or frequency at which the transferring device is required to transfer the data, i.e., the frequency at which the device will be transferring the data. The periodic data transfer request also includes information regarding the approximate amount of data involved in the periodic transfers as well as any real-time constraint information.

In response to the transferring device transferring the periodic transfer request in step 554, the receiving device uses the received information to determine if it can guarantee availability at the requested time frequency to receive the data. If the receiving device can guarantee availability for receiving this periodic data, then the receiving device preferably performs a handshake to indicate that the periodic data transfers can be performed. The receiving device also preferably configures one or more timers or counters at the specified frequency to indicate when the receiving device should enable its buffers and transceivers to receive the periodic data on the bus 130.

In step 556, the transmitting multimedia device determines if the receiving device has indicated availability for the periodic transfer. Thus, when the receiving device receives the periodic data transfer request in step 554, the receiving device determines if the receiving device can guarantee a certain bandwidth and availability at the designated time indicated by the periodic data transfer request. If the receiving device cannot guarantee availability at the frequency or period specified by the periodic data transfer request, then the receiving device indicates that it is not available for periodic data transfers. In this case, in step 562 the transmitting multimedia device sets the periodic transfer flag to no and in step 564 performs a single transfer. In this instance, each future transfer of the periodic data requires that step 552 be performed to transfer control and addressing information to the receiving device to set up the transfer.

If the receiving device indicates availability for the periodic data transfer in step 556, then in step 558 the transmitting multimedia device sets the periodic transfer flag to yes and in step 560 the transferring device begins the first of a plurality of periodic transfers at the frequency or period specified in the periodic data transfer request in step 554. If the transferring device has indicated a desire to transfer periodic data streams on the multimedia bus 130, and the receiving device has indicated availability to perform the transfers, then the transferring device performs periodic transfers of data streams to the receiving device. In this instance, the receiving device has indicated that it can guarantee availability at the times required by the transmitting device. Thus the receiving is available to receive each transfer of periodic data.

Figure 10:
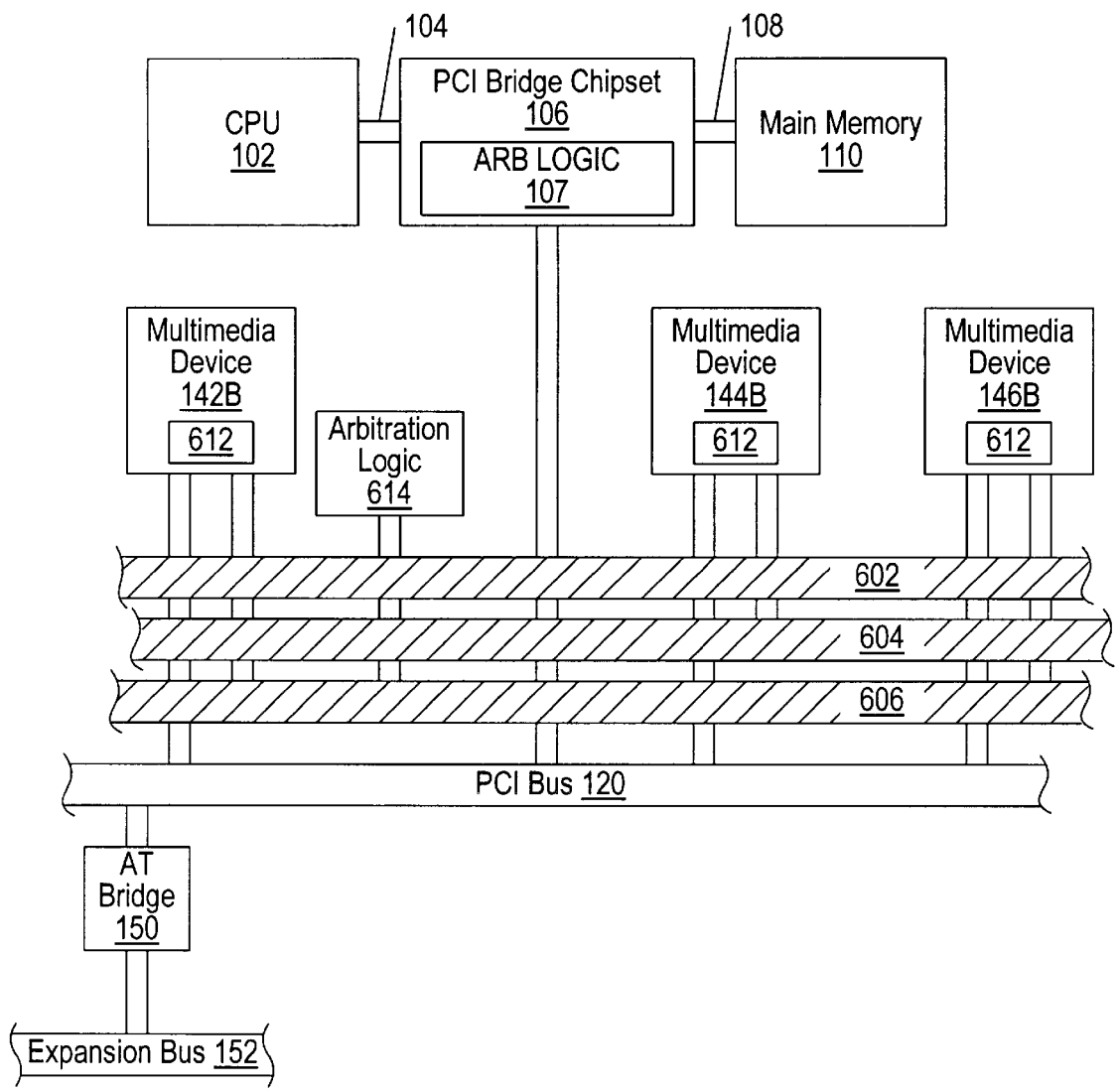
FIG. 10 is a block diagram of a computer system including a local expansion bus and separate multimedia channels for video, audio, and communications.

FIG. 10—Multimedia Channels

Referring now to FIG. 10, a computer system is shown which includes a plurality of individual multimedia channels for two or more of video data, audio data, and communication data. The computer system of FIG. 10 is similar to the computer systems of FIGS. 1 and 7. However, the computer system of FIG. 10 does not include a single general purpose multimedia bus, but rather includes separate video, audio, and communications channels 602–606. These separate channels 602–606 may be in addition to the PCI bus 120, or may replace the PCI bus 120. In the following description, elements which are preferably identical to elements previously described include the same reference numerals for convenience.

As shown, the computer system includes a central processing unit (CPU) 102 which is coupled through a CPU local bus 104 to a host/PCI/cache bridge or chipset 106. The chipset 106 includes various bridge logic, peripheral logic and arbitration logic 107, as described above with reference to FIG. 1. The bridge or chipset 106 couples through a memory bus 108 to main memory 110. The main memory 110 is preferably DRAM (dynamic random access memory) or EDO (extended data out) memory, or other types of memory, as desired. The chipset logic 106 preferably includes a memory controller for interfacing to the main memory 110.

The host/PCI/cache bridge or chipset 106 interfaces to a local expansion bus or system bus 120. In the preferred embodiment, the local expansion bus 120 is the peripheral component interconnect (PCI) bus 120. However, it is noted that other local buses may be used. Various types of devices may be connected to the PCI bus 120. Expansion bus bridge logic 150 and an expansion bus 152 may also be coupled to the PCI bus 120, as described above.

The computer system shown in FIG. 10 includes a plurality of real-time data channels, including a video channel 602, an audio channel 604, and a communications channel 606. In the preferred embodiment, the video data channel 602 is used for transferring video and/or graphics information, the audio channel 604 is used for transferring audio information, and the optional third channel 606 is for transferring communications information. The video channel is preferably 32 bits, 24 bits, 16 bits, or a high speed serial channel. The audio channel is preferably 16 bits or 8 bits. Alternatively, the audio channel is a very high speed serial bus. The communications channel is also preferably either 16 or 8 bits, or a high speed serial bus. Alternatively, the system shown in FIG. 10 may include a mixture of dedicated (i.e. video only) and shared (i.e. audio and communications) channels. The video, audio and communication channels are preferably physically and electrically separate channels. The video, audio, and communication channels may each have individual addressing and control portions or may use the addressing and control portions of the expansion bus 120.

One or more multimedia devices or multimedia devices 142B, 144B, and 146B are coupled to each of the PCI bus 120 and to each of the data channels 602–606. The multimedia devices 142B–146B preferably multiplex data onto the respective channels for reduced pinout requirements. The multimedia devices 142B–146B each include bus interface circuitry 612 which includes standard PCI interface circuitry for communicating on the PCI bus 120, and interface logic for interfacing to each of the channels 602–606. The multimedia devices 142B–146B use the respective channels 602–606 to communicate data of the respective data type between the respective devices.

As described above, the multimedia devices 142B–146B may be any of various types of input/output devices, including multimedia devices and communication devices, as described above. The multimedia devices 142B–146B are preferably similar to the multimedia devices 142–146 described above, except that the interface logic 612 in each of the multimedia devices 142B–146B includes channel interface logic for each data channel 602–606. As described above, the multimedia devices 142B–146B may comprise video accelerator or graphics accelerator cards, video playback cards, MPEG decoder cards, sound cards, network interface cards, SCSI adapters for interfacing to various input/output devices, such as CD-ROMS and tape drives, or other devices as desired.

Thus, the multimedia devices 142B–146B communicate with each other via the PCI bus 120 and also communicate with the CPU 102 and main memory 110 via the PCI bus 120, as is well known in the art. The multimedia devices 142B–146B also communicate data between each other using the data channels 602–606.

The multimedia devices 142B–146B use each of these channels 602–606 for high speed data transfers. The multimedia devices 142B–146B use either the PCI bus 120 or a dedicated control channel (not shown) for addressing and control for transfers on one or more of the data channels 602–606.

In one embodiment of the system of FIG. 10 which includes a control channel (not shown), as described above with reference to FIG. 7, arbitration logic 614 is coupled to each of the data channels 602–606 and the control channel and performs arbitration for the devices 142B–146B on the channels 602–606. In this embodiment, the multimedia devices 142B–146B provide request signals on the control channel to the arbitration logic 614, and the arbitration logic 614 grants channel access according to a desired arbitration method.

Figure 11:
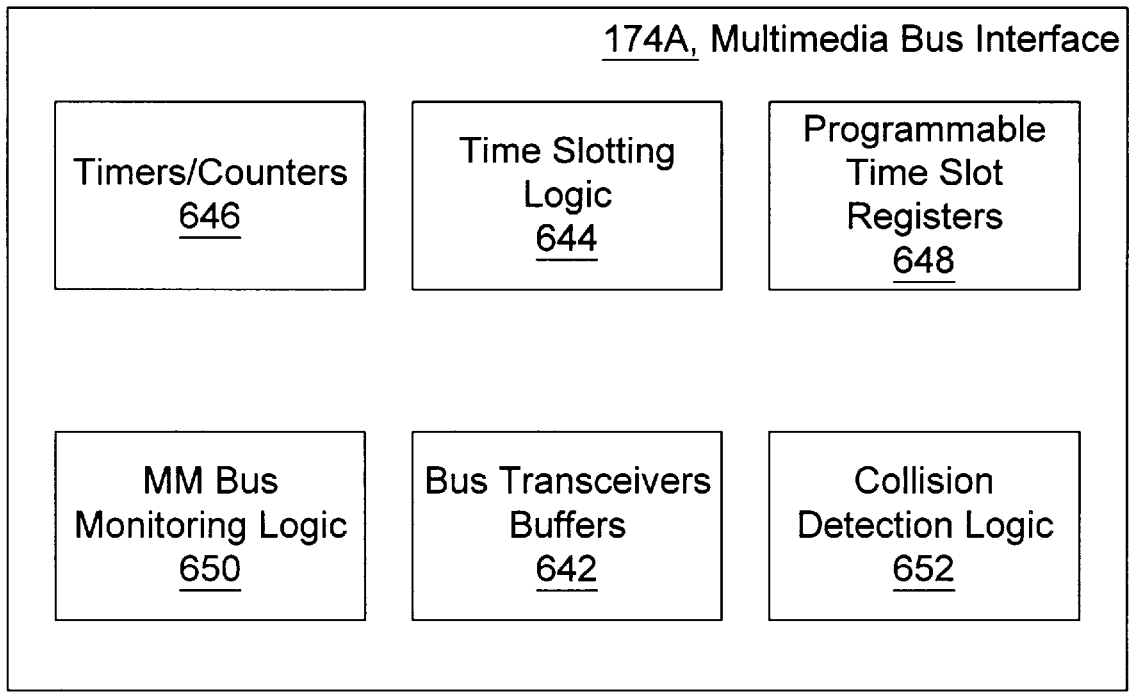
FIG. 11 is a block diagram of an embodiment of the multimedia bus interface in the multimedia device of FIGS. 2 or 8 which includes time slot logic according to the present invention.

FIG. 11—Multimedia Bus Interface with Timeslotting Logic

Referring again to FIGS. 1 and 7, in one embodiment the multimedia bus 130 is time sliced wherein time slices or time slots are allocated in proportion to the required bandwidth. In this embodiment, the multimedia devices, such as the multimedia devices 142 shown in FIG. 2 or 142A shown in FIG. 8 include time slotting logic. Referring now to FIG. 11, logic components of a multimedia bus interface 174 comprised in the multimedia devices in this embodiment are shown. Multimedia bus interface logic 174A shown in FIG. 11 is preferably comprised in each of the multimedia devices or multimedia devices comprised in a computer system, such as the multimedia devices 142–146 shown in FIG. 1 or the multimedia devices 142A–146A shown in FIG. 7. As shown, each multimedia bus interface 174A in the device includes bus transceivers and buffers 642 for interfacing to the respective multimedia bus 130.

The multimedia bus interface 174A also includes timeslotting logic 644 for controlling access of the respective multimedia device to the multimedia bus 130. The timeslotting logic 644 preferably uses one or more timers and counters 646 for determining respective timeslot. The multimedia bus interface logic 174A also includes programmable timeslot registers which are programmed by a central agent, such as the CPU 102, with the respective timeslot position and length on the multimedia bus. In one embodiment, the CPU 102 programs a timeslot into each of the multimedia devices at startup or boot time, thus providing a static allocation of timeslots. Alternatively, software executing on the CPU 102 dynamically programs timeslots in each of the multimedia devices dependent upon real-time processes and applications occurring in the computer system. The timeslotting logic 644 preferably includes synchronization logic which operates in conjunction with the timers and counters 646 and the programmable timeslot registers 648 storing the respective timeslot allocated to the respective device. The multimedia bus interface logic 174A further includes multimedia bus monitoring logic 650 for monitoring conditions on the bus and includes collision detection logic 652 for determining when a bus transfer from the respective multimedia device has inadvertently collided with another devices transfer. The multimedia bus monitoring logic 650 preferably insures that the multimedia bus 130 is inactive and has been inactive for a preset period of time before the timeslotting logic 644 allows the data transfer to begin.

In one embodiment, as shown in FIG. 12A, the time slices are each a constant size and a number of the equal sized time slots are allocated to respective data streams in proportion to the required band width. In this embodiment, for example, video data streams may be allocated more time slots than audio data streams because of the increased data transfer band width requirements of video streams. Alternatively, as shown in FIG. 12B, the time slots are not equally sized, but rather are dynamically sized or allocated to data streams in proportion to the required bandwidth and may be reprogrammable as conditions within the system change.

In this embodiment, multimedia devices that connect to the multimedia bus include intelligent controller circuitry which includes knowledge of the respective time slice allocated to the multimedia device. In this embodiment, arbitration for the multimedia bus is not required. Rather, a multimedia device programmed as a transmitter of video data monitors the bus and includes controller circuitry which begins transmitting the video data when the device's respective time slot occurs. A corresponding device programmed as a receiver of said data also knows that the current time slot is a video time slot and monitors the bus to receive the data.

In this embodiment, the interface circuitry of each of the multimedia devices are programmed at boot time for a static allocation of time slots. Alternatively, the interface circuitry in the multimedia devices is dynamically programmed by a central controller dependent upon the mix of real-time processes and applications and the corresponding data transfer bandwidth requirements. For example, the CPU may program each of the multimedia devices with a respective time slot at power-on. Alternatively, if the mix of real-time processes change, the CPU may dynamically or heuristically allocate time slots based on bandwidth requirements.

FIG. 13

Figure 13:
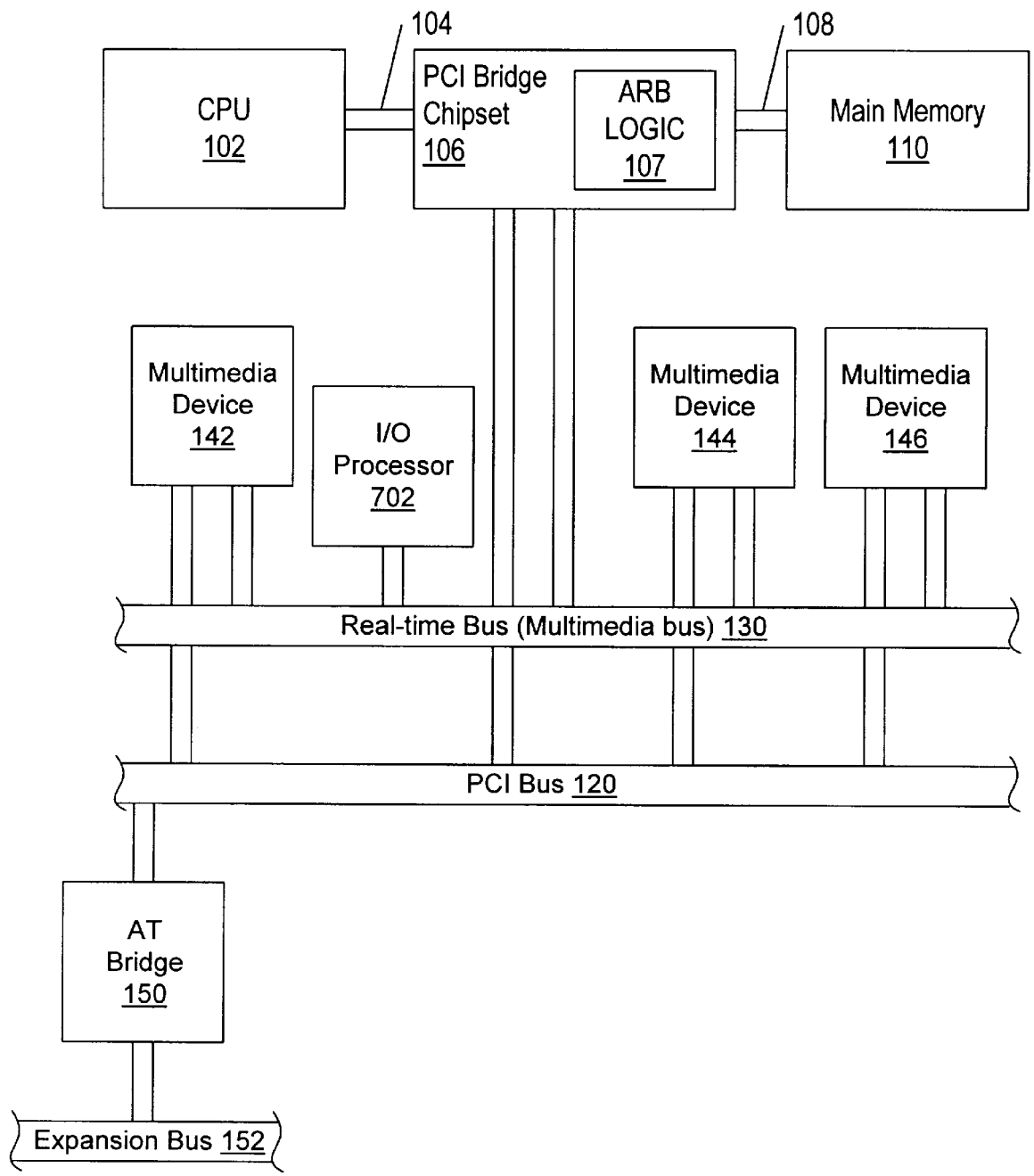
FIG. 13 is a block diagram of a computer system including a local expansion bus and a real-time bus or multimedia bus and also including a centralized multimedia I/O processor.

Referring now to FIG. 13, an alternate embodiment of the computer system of FIG. 1 is shown. This computer system shown in FIG. 13 is preferably similar or identical to the system shown in FIG. 1 except that the system shown in FIG. 13 includes a dedicated multimedia I/O processor 702 coupled to the multimedia bus 130 which controls operations on the multimedia bus 130. The I/O Processor 702 is preferably implemented within the PCI Bridge Chipset 106, but may alternatively be implemented external to the chipset as shown in FIG. 13.

In this embodiment of the invention, the centralized multimedia I/O processor operates to direct or "pull" data stream information through the system. The multimedia I/O processor 702 is programmed with knowledge of the various data rates, data periodicity, data sources and destinations, and coordinates all transfers within the system. Thus, the multimedia I/O processor 702 creates connections between two or more devices, sets up transfers between devices, and (optionally) executes the transfer. The centralized multimedia I/O processor of the present invention may be used exclusively in the multimedia bus 130 or may be used on a standard PCI bus 120.

Figure 14:
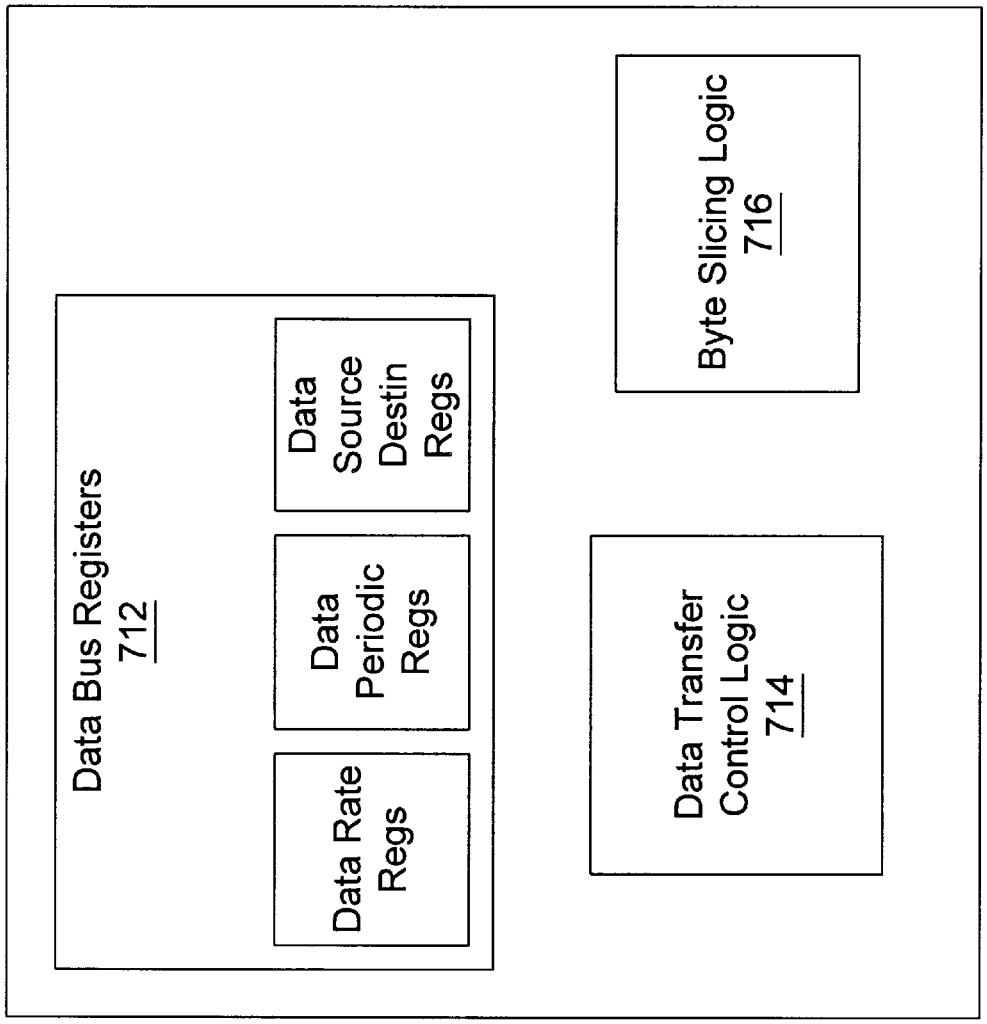
FIG. 14 is a block diagram of the centralized multimedia I/O processor of FIG. 13.

Referring now to FIG. 14, a block diagram illustrating the multimedia I/O controller 702 shown in FIG. 13 is shown. As shown, the multimedia I/O processor includes a plurality of data bus registers and/or a data bus memory which stores information regarding the data rates of each the devices, the data periodicity of each of the devices, and the respective data sources and destination devices comprised in the system. The multimedia I/O device 702 also includes data transfer control logic 714 which is coupled to the data bus registers and controls transfers on the multimedia bus 130. The multimedia I/O processor 702 further includes byte slicing logic 716.

In one embodiment, the centralized multimedia I/O processor 702 byte slices the multimedia bus to allow different data streams to use different byte channels simultaneously. Thus the byte sliced multimedia bus allows different peripherals to share the bus simultaneously. The centralized multimedia I/O processor 702 thus may assign one data stream to a subset of the total byte lanes on the multimedia bus 130, and fill the unused byte lanes with another data stream. For example, with a 32-bit multimedia bus, if an audio data stream is only 16 bits wide and thus only uses half of the multimedia data bus 130, the multimedia I/O processor 702 intelligently allows data stream transfers on the unused bits of the multimedia bus 130. In this embodiment, the centralized multimedia I/O processor 702 includes knowledge of the destinations and allows transfers to occur without addressing information.

Figure 15:
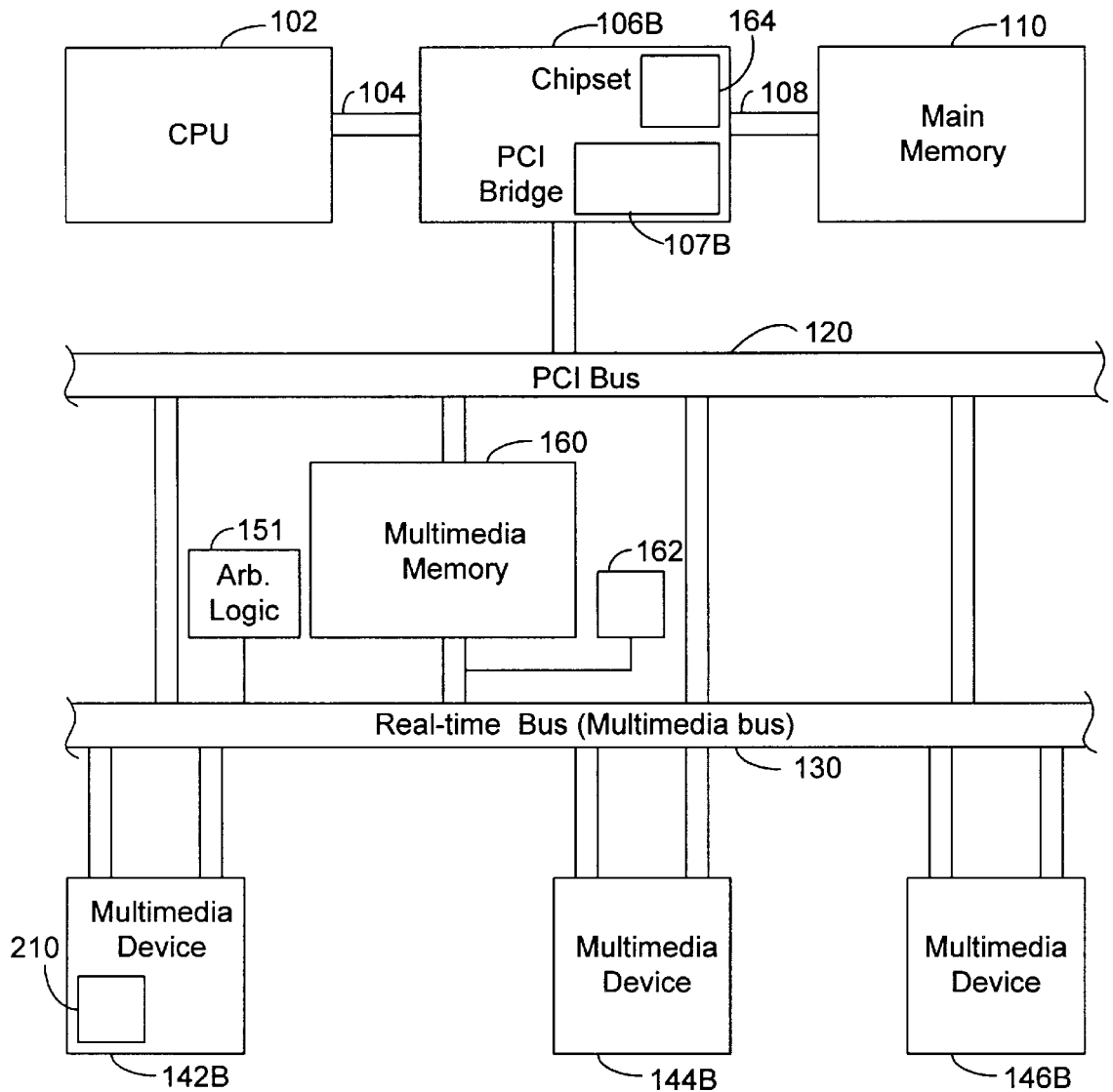
FIG. 15 is a block diagram of a computer system including a local expansion bus and a real-time bus and including a multimedia memory according to an alternate embodiment of the present invention.
Figure 16:
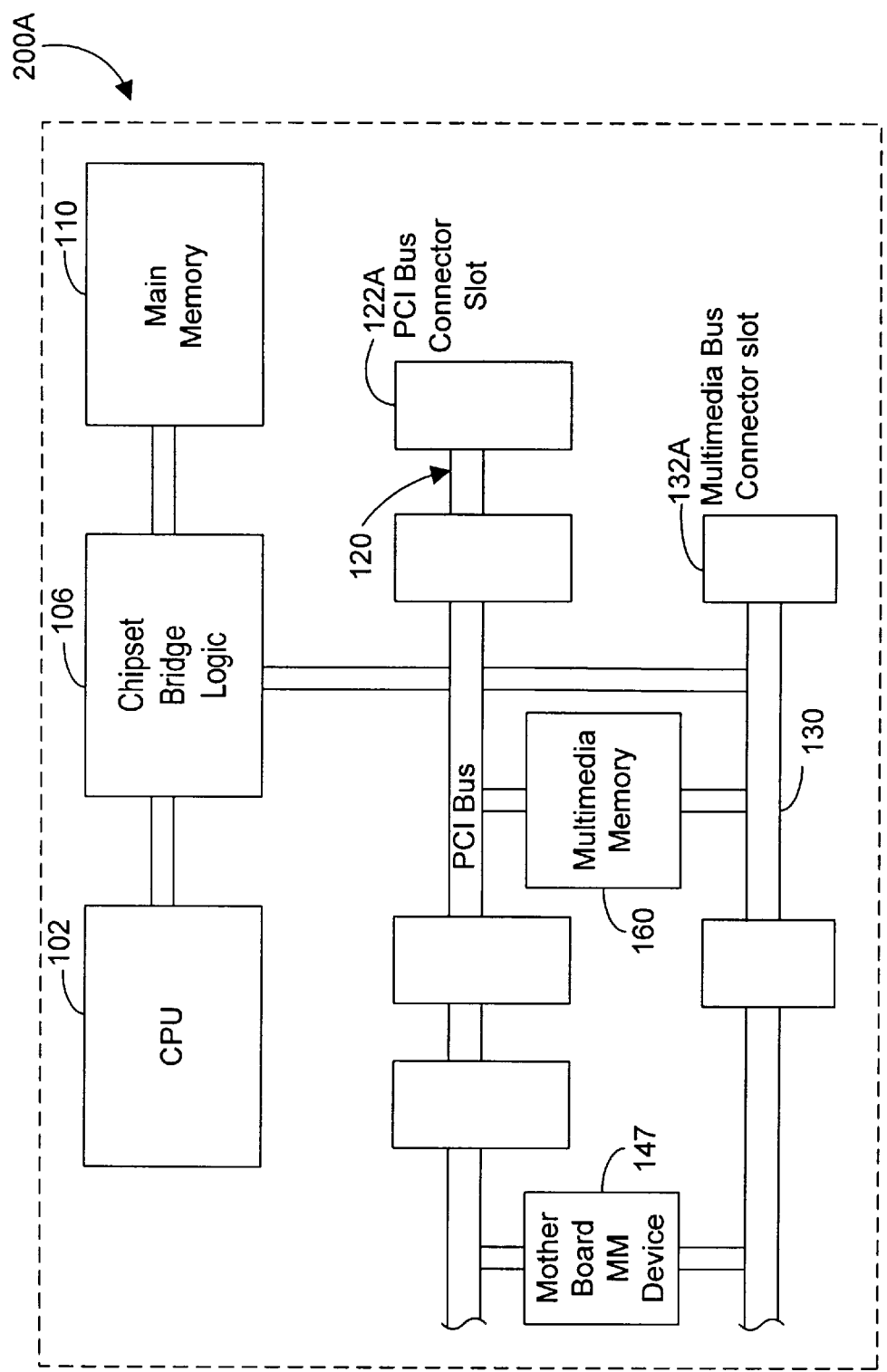
FIG. 16 is a block diagram of the motherboard of the computer system of FIG. 5.

FIG. 15—Multimedia Memory Embodiment

Referring now to FIG. 15, a block diagram of the computer system according to an alternate embodiment of the present invention and including a multimedia memory 160 is shown. The computer system of FIG. 15 is similar to the computer system of FIG. 1. However, the computer system of FIG. 15 includes a multimedia memory 160 coupled to each of the PCI bus 120 and to the real-time bus 130. In the following description, elements which are preferably identical to elements previously described include the same reference numerals for convenience.

As shown, the computer system includes a central processing unit (CPU) 102 which is coupled through a CPU local bus 104 to a host/PCI/cache bridge or chipset 106B. The chipset 106B includes arbitration logic 107B according to the present invention. The chipset 106B is preferably similar to the Triton chipset available from Intel Corporation, including certain arbiter modifications to accommodate the real-time bus 130 and the multimedia memory 160 of the present invention. A second level or L2 cache memory (not shown) may be coupled to a cache controller in the chipset, as desired. The bridge or chipset 106B couples through a memory bus 108 to main memory 110. The main memory 110 is preferably DRAM (dynamic random access memory) or EDO (extended data out) memory, or other types of memory, as desired.

The chipset logic 106B preferably includes a memory controller for interfacing to the main memory 110 and also includes the arbitration logic 107B. The chipset logic 106B preferably includes a direct memory access (DMA) system or engine 164 which performs various DMA operations. The chipset logic 106B preferably includes other various peripherals, as described above with reference to FIG. 1.

The host/PCI/cache bridge or chipset 106B interfaces to a local expansion bus 120. In the preferred embodiment, the local expansion bus 120 is the peripheral component interconnect (PCI) bus 120. However, it is noted that other local buses may be used, such as the VESA (Video Electronics Standards Association) VL bus. Various types of devices may be connected to the PCI bus 120.

The computer system shown in FIG. 15 also includes a real-time bus, also referred to as a multimedia bus 130. The real-time bus 130 preferably includes a 32 or 64 bit data path and may also include address and control portions. The real-time bus 130 may be identical to either the real-time bus 130 shown in FIG. 1 or the real-time bus 130A shown in FIG. 1. Alternatively, the real-time bus 130 includes various address and control signals for accessing the multimedia memory 160.

Multimedia memory 160 is coupled to each of the PCI bus 120 and the real-time bus 130. In the embodiment of FIG. 15, the multimedia memory 160 is preferably dual ported memory. In this embodiment, a first port of the memory 160 couples to the PCI bus 120. The second port of the multimedia memory 160 couples to the real-time bus 130. The multimedia memory 160 preferably comprises high speed dual ported VRAM (video random access memory), dual ported DRAM (dynamic random access memory), SRAM (static random access memory), or another type of memory as desired. The computer system preferably includes a dual port DRAM memory controller 162 for controlling the dual port memory functions of the multimedia memory 160. For more information on the operation of a dual port memory controller, please see the Intel 8207 Dual-Port Dynamic RAM Controller Data Sheet (Order No. 210463-007), available from Intel Corporation, which is hereby incorporated by reference.

In the preferred embodiment, the real-time bus 130 includes only a 32 bit or 64 bit data path and does not include address or arbitration portions. In one embodiment, devices use the PCI bus 120 for arbitration, addressing and setup, and devices use the multimedia or real-time bus 130 for high speed data transfers between each other and also to/from the multimedia memory 160. Thus, in one embodiment, devices use the PCI bus 120 to provide addressing and control signals to the multimedia memory 160 and use the multimedia or real-time bus 130 for high speed data transfers to and from the multimedia memory 160.

One or more multimedia devices 142C, 144C, and 146C are coupled to each of the PCI bus 120 and the real-time bus 130. The multimedia devices 142C–146C include standard PCI interface circuitry for communicating on the PCI bus 120. The multimedia devices 142C–146C also include interfaces to the real-time bus 130. The multimedia devices 142C–146C use the real-time bus 130 to communicate data between the respective devices. As described above, one or more of the multimedia devices 142C–146C may be comprised on modular expansion cards adapted for insertion into respective slots of each of the real-time bus 130 and PCI bus 120. One or more of the multimedia devices 142C–146C may be implemented directly on the motherboard or on a custom circuit card plugged into the motherboard.

In one embodiment, arbitration logic 151 is coupled to the real-time bus 130 and performs arbitration for the devices 142C–146C on the bus 130. In this embodiment, the multimedia devices 142C–146C provide request signals on the real-time bus 130, and the arbitration logic 151 grants bus access according to a desired arbitration method. Alternatively, the arbitration logic 151 is not included, and the multimedia devices 142C–146C use the PCI bus arbitration to gain control of the real-time bus 130.

The multimedia devices 142C–146C may be any of various types of input/output devices, including multimedia devices and communication devices. For example, the multimedia devices 142C–146C may comprise video accelerator or graphics accelerator cards, video playback cards, MPEG decoder cards, sound cards, network interface cards, SCSI adapters for interfacing to various input/output devices, such as CD-ROMs and tape drives, or other devices as desired.

Thus, the multimedia devices 142C–146C communicate with each other via the PCI bus 120 and communicate with the CPU and main memory 110 via the PCI bus 120, as is well known in the art. The multimedia devices 142C–146C also communicate data between each other and the multimedia memory 160 using the real-time bus or multimedia bus 130. When the multimedia devices 142C–146C communicate using the real-time bus 130, the devices are not required to obtain PCI bus mastership and they do not consume PCI bus cycles. In one embodiment, the multimedia devices 142C–146C communicate with the multimedia memory 160 using either or both of the real-time bus 130 and the PCI bus 120.

Expansion bus bridge logic (not shown) may also be coupled to the PCI bus 120. The expansion bus bridge logic interfaces to a secondary expansion bus (also not shown). The expansion bus may be any of varying types, including the industry standard architecture (ISA) bus, also referred to as the AT bus, the extended industry standard architecture (EISA) bus, or the microchannel architecture (MCA) bus. Various devices may be coupled to the expansion bus, such as expansion bus memory or a modem (both not shown).

In the embodiment of FIG. 15, each of the multimedia devices 142C–146C include PCI interface logic for coupling to the PCI bus 120 and also include real-time bus interface logic for interfacing to the real-time bus 130. Each of the multimedia devices 142C–146C also include arbitration logic for gaining control of the real-time bus 130 and further include logic which gains access to the multimedia memory 160. Thus, each of the multimedia devices 142C–146C can gain control of the real-time bus 130 and access the multimedia memory 160 to retrieve desired code and data.

Figure 17:
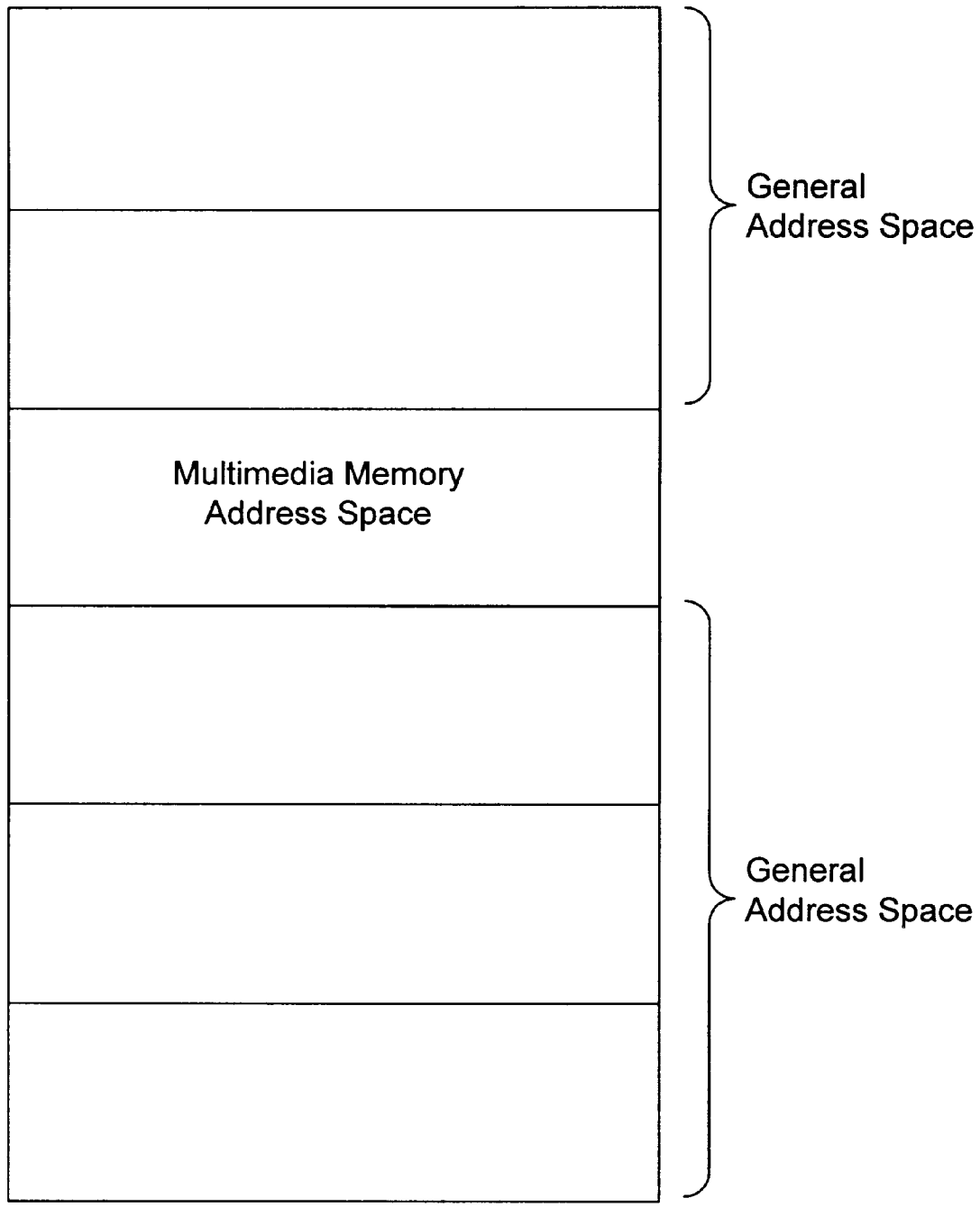
FIG. 17 illustrates the address space of the main memory and the multimedia memory.

In the embodiment of FIG. 15, the multimedia memory 160 is mapped to the main memory address space and thus comprises a portion of the main memory address space, as shown in FIG. 17. Thus the multimedia memory 160 is available to store non-multimedia data as needed. In other words, if the main memory 110 becomes full and additional memory is needed, the CPU 102 can store code and data in the multimedia memory 160. Thus, in the embodiment the multimedia memory 160 is used for real-time or multimedia data and is also used by the CPU 102 as overflow memory space.

In the embodiment shown in FIG. 15, one or more of the multimedia devices 142C–146C includes at least one DSP engine 210 which preferably performs a multimedia or communications function, such as video and audio processing functions. In the preferred embodiment, the DSP engine 210 is a general purpose DSP engine that is programmable to perform either video or audio processing functions as well as other real-time functions. In one embodiment, the DSP engine 210 includes one or more ROMs or RAMs which store microcode or instructions corresponding to video and audio processing instructions or commands. When programmed as a graphics accelerator, the DSP engine 210 preferably performs video and graphics functions such as polygon rendering and texture mapping, among others. When programmed as a sound card, the DSP engine 210 preferably performs audio functions such as MIDI and wavetable synthesis, among others. The DSP engine 210 may also be programmed to perform communication functions, such as ISDN connectivity or modem functionality, as desired. In another embodiment, the DSP engine is not a general purpose DSP engine but is instead a device that is optimized for the performance of one or more multimedia or communications functions.

In the embodiment shown in FIG. 15, the chipset 106B preferably includes DMA transfer engine 164 which performs data transfers between the main memory 110 and the multimedia memory 160. The DMA transfer engine 164 preferably transfers data from the main memory 110 to the multimedia memory 160 contemporaneously with operations performed by the one or more multimedia devices 142C–146C. In one embodiment, the multimedia memory 160 is partitioned into two or more separate address spaces or buffers, and the DMA engine 164 transfers data from main memory 110 to a first address space or buffer in the multimedia memory 160 while one of the multimedia devices 142C–146C accesses commands and data from the other address space or buffer.

As mentioned above, the main memory 110 and the multimedia memory 160 preferably share a common address space. FIG. 17 illustrates the main memory address space, wherein the multimedia memory 160 comprises part of the main memory address space. Thus the multimedia memory 160 is available to store non-multimedia data as needed. In this embodiment, each of the multimedia devices 142C–146C and CPU 102 must also arbitrate for access to the multimedia memory 160. The multimedia devices 142C–146C preferably have priority access to the multimedia memory 160. In one embodiment, a multimedia device simply writes one or more bits to a register in the arbitration logic 107B in the chipset 106B to gain control of the multimedia memory 160, and the CPU 102 is only granted access to the multimedia memory 160 after a certain starvation period.

Multimedia Memory—System Operation

Figure 18:
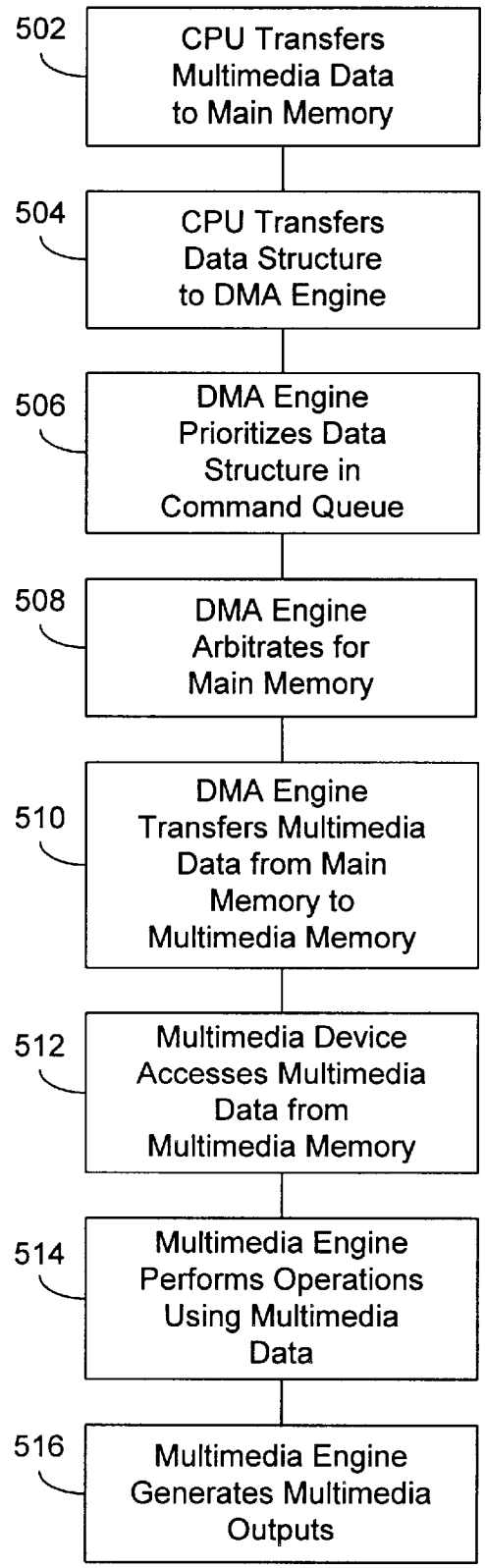
FIG. 18 is a flowchart diagram illustrating operation of data transfers from the main memory to the multimedia memory.

FIG. 18 is a flowchart diagram illustrating operation of the present invention. In the preferred embodiment, the main memory 110 stores the operating system and applications software as well as driver software, including video drivers and audio drivers. The CPU 102 executes applications software and driver software from the main memory 110 and generates real-time or multimedia data. In the present disclosure, the term "multimedia data" refers to video or graphical data, audio data, telephony data, and other types of real-time or communication data.

When an application executing on the CPU 102 generates multimedia data, the CPU 102 preferably transfers or writes the multimedia data to the main memory 110 in step 502. The multimedia data includes data and may include one or more commands that perform operations on the data.

In an alternate embodiment, the CPU 102 provides the multimedia data directly to the multimedia memory 160 through the PCI bus 120, and operation proceeds directly to step 512. In this embodiment, the CPU 102 provides the multimedia data through the PCI bus 120 directly to the multimedia memory 160, and the multimedia devices 142C–146C access commands and data from the multimedia memory 160 through the multimedia bus 130.

After the CPU 102 preferably writes the multimedia data to the main memory 110 in step 502, the CPU 102 then provides a data structure directly to the DMA engine 164 in the chipset logic 106B in step 504. The data structure comprises location information regarding the multimedia data, including the beginning address of the data, the length or number of bytes of the data, as well as other information. Alternatively, the CPU 102 provides the data structure to buffers within the DMA engine 164. The data structure may also include high level instructions or commands regarding the nature or purpose of the data.

In step 506 the DMA engine 164 prioritizes the data structure with other real-time data structures that have already been received. Thus the DMA engine 164 intelligently prioritizes received multimedia data structures based on a desired priority scheme and the available resources. Thus, the video and audio components of a multimedia presentation may receive a higher priority than a telephony application that can be performed in the background. In an alternate embodiment, the DMA engine 164 does not prioritize received data structures or commands, but rather merely acts as a slave and executes received data structures in the order they are received.

In step 508 the DMA engine 164 arbitrates for access to the main memory 110. This involves asserting a bus request signal to the arbitration logic 107B in the chipset 106B. The DMA engine 164 may also provide a priority byte to the arbitration logic 107B which is used by the arbitration logic 107B in determining the arbitration. Once the DMA engine 164 achieves access to main memory 110, the DMA engine 164 uses the data structure received from the CPU 102 to access the real-time data from main memory 110 and store the data in the multimedia memory 160 in step 510.

In one embodiment, the CPU 102 writes video or audio instructions or commands to the main memory 110 in conjunction with the corresponding video and/or audio data. In this embodiment, the CPU 102 writes only pointer information to the DMA engine 164 which points to the beginning address in main memory 110 where the data and commands reside. The pointer information includes the beginning address of the data, the length or number of bytes of the data, as well as other information. In step 510 the DMA engine 164 uses the pointer information to retrieve the commands and data from main memory 110 into the multimedia memory 160.

Once real-time or multimedia data and commands have been placed in the multimedia memory 160, either by the CPU 102 or retrieved from main memory 110, in step 512 one or more of the multimedia devices 142C–146C read the commands and data from the multimedia memory 160 and in step 514 perform the necessary graphics and audio processing functions. The respective multimedia device 142C–146C then generates the appropriate video and audio signals to the video and audio ports in step 516. In one embodiment, the multimedia memory 160 is partitioned into separate address spaces for commands and data, and the multimedia device retrieves commands from a first address space and retrieves data from a second address space.

The CPU 102 preferably writes video and/or audio commands and data to the main memory 110 instead of directly to the multimedia memory 160 in order to minimize CPU accesses to the multimedia memory 160. This ensures that the multimedia devices 142C–146C have full access to the multimedia memory 160 for real-time processing. Further, the multimedia devices 142C–146C retrieve commands and data from the main memory 110 only when necessary, and the multimedia devices 142C–146C are not "locked out" of the multimedia memory 160 due to CPU writes to the multimedia memory 160.

In an alternate embodiment, as mentioned above, the CPU 102 writes video and/or audio data and commands directly to the multimedia memory 160. In this embodiment, the CPU 102 executes applications software and driver software from the main memory 110 and writes any associated video and audio data directly to the multimedia memory 160. The driver software also writes high level commands directly to the multimedia memory 160. Thus, the video drivers write high level commands to the multimedia memory 160 in a similar manner to current PCI-based graphics acceleration cards.

In one embodiment, the multimedia memory 160 is separated into two or more address spaces or buffers, and the CPU 102 writes to one address space or buffer while the one or more multimedia devices 142C–146C accesses commands and data from the other address space or buffer. This ensures that the multimedia devices 142C–146C have uninterrupted access to commands and data in the multimedia memory 160 while also allowing the CPU 102 to directly write real-time commands and data to the multimedia memory 160.

Figure 19:
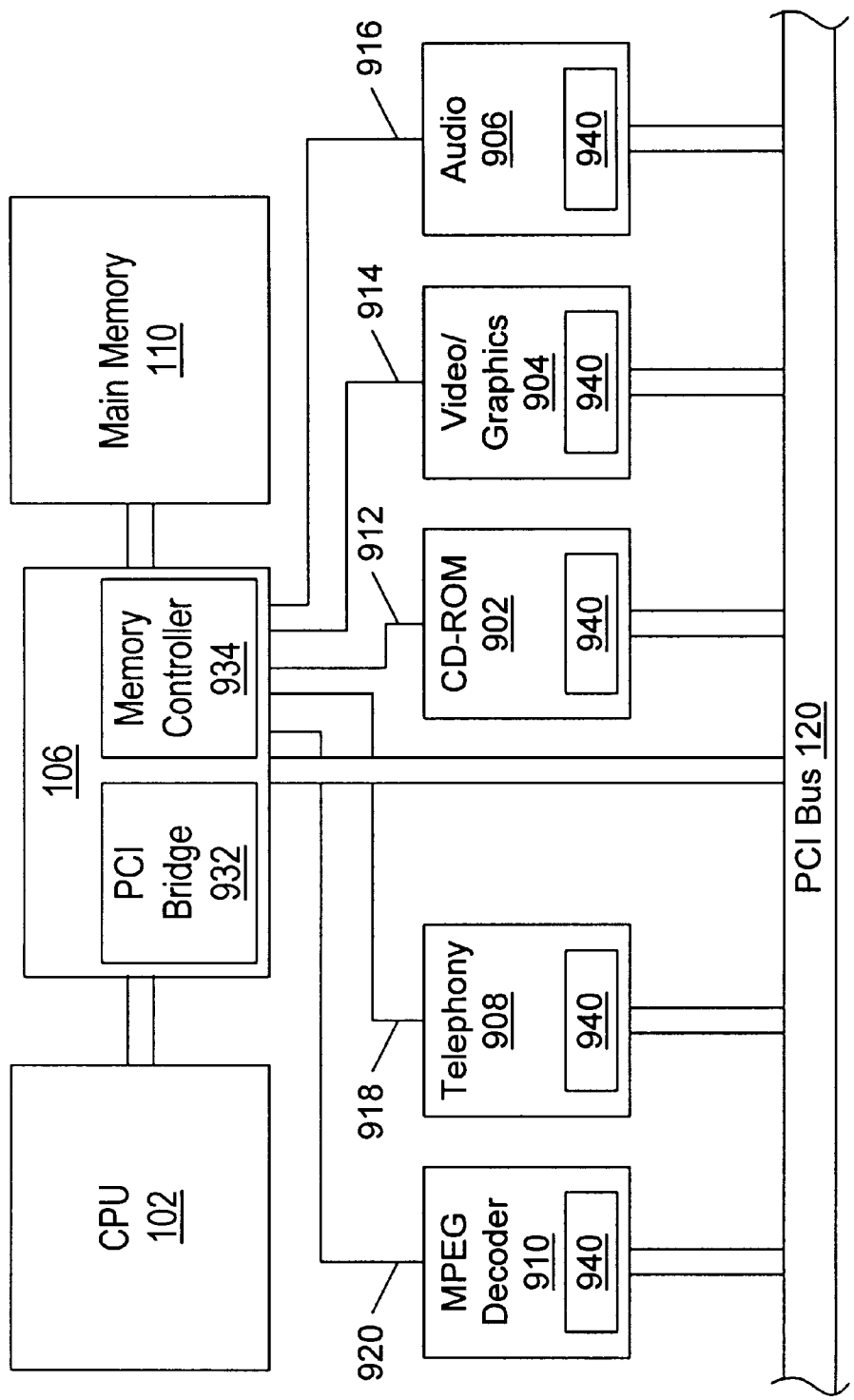
FIG. 19 is a block diagram of a computer system including a plurality of high speed memory channels for each peripheral device.

FIG. 19—High Speed Memory Channel Per Peripheral

Referring now to FIG. 19, a computer system is shown which includes a PCI or multimedia bus 120 and which also includes a separate memory data channel for each peripheral connected to the bus 120. The computer system of FIG. 19 is similar to the computer system of FIG. 1. However, the computer system of FIG. 19 includes a separate memory data channel for each peripheral to the memory controller. As described below, multimedia devices use the respective memory data channel 130 for high speed data transfers. In the following description, elements which are preferably identical to elements previously described include the same reference numerals for convenience.

As shown, the computer system includes a central processing unit (CPU) 102 which is coupled through a CPU local bus 104 to a host/PCI/cache bridge or chipset 106. The chipset 106 includes various bridge logic, peripheral logic and arbitration logic 107, as described above with reference to FIG. 1. As shown, the chipset 106 includes PCI bridge logic 932 and a memory controller 934. The bridge or chipset 106 couples through a memory bus 108 to main memory 110. The main memory 110 is preferably DRAM (dynamic random access memory) or EDO (extended data out) memory, or other types of memory, as desired. The memory controller 934 in the chipset 106 interfaces to the main memory 110.

The host/PCI/cache bridge or chipset 106 interfaces to a local expansion bus or system bus 120. In the preferred embodiment, the local expansion bus 120 is the peripheral component interconnect (PCI) bus 120 or other type of system bus such as a dedicated multimedia or real-time bus. Various types of devices may be connected to the PCI bus 120. Expansion bus bridge logic 1 and an expansion bus (both not shown) may also be coupled to the PCI bus 120, as described above.

One or more multimedia devices or multimedia devices 902–910 are coupled to the PCI bus 120. In the embodiment shown, a CD-ROM 902, a Video/Graphics card 904, an Audio card 906, a telephony card 908, and an MPEG decoder card 910 may be coupled to the PCI bus 120. Various other types of peripherals may be connected to the bus 120, as desired.

Each of the multimedia devices 902–910 includes a dedicated memory data channel 912–920, respectively, which connects to the memory controller 934 in the chipset logic 106. Each of the memory data channels is preferably a high speed serial bus, such as the Philips I²C serial bus from Philips Corp., or a 4 bit, 8 bit bus, or 16 bit bus. Each of the multimedia devices 902–910 uses its dedicated memory data channel 912–920 to perform data accesses and transfers directly to the main memory 110, bypassing PCI bus arbitration and PCI bus cycles. The dedicated memory channels may also be coupled directly to the main memory 110 instead of to the memory controller 934.

The multimedia devices 902–910 each include bus interface circuitry 940 which includes standard PCI interface circuitry for communicating on the PCI bus 120. The interface circuitry 940 in each of the multimedia devices 902–910 also includes interface logic for interfacing to the respective dedicated memory data channel 912–920. The multimedia devices 902–910 use the PCI bus 120 to communicate data between the respective devices, and each uses its respective channel for main memory accesses.

The multimedia devices 902–910 may be any of various types of input/output devices, including multimedia devices and communication devices, as described above. The multimedia devices 902–910 are preferably similar to the multimedia devices 902–910 described above, except that the interface logic in the multimedia devices 902–910 each include memory data channel interface logic, as described below. As described above, the multimedia devices 902–910 may comprise video accelerator or graphics accelerator cards, video playback cards, MPEG decoder cards, sound cards, network interface cards, SCSI adapters for interfacing to various input/output devices, such as CD-ROMS and tape drives, or other devices as desired.

Thus, the multimedia devices 902–910 communicate with each other via the PCI bus 120 and also communicate with the CPU 102 and main memory 110 via the PCI bus 120, as is well known in the art.

The multimedia devices 902–910 also each communicate data to and from the main memory 110 using the device's respective dedicated memory data channel. The multimedia devices 902–910 preferably each use its dedicated memory data channel for addressing, control, status and handshaking signals, as well as for data communications. Thus the devices 902–910 do not utilize any PCI bus cycles when communicating over their respective memory data channel. Alternatively, the multimedia devices 902–910 set up the memory data channel transfer using PCI bus cycles and then perform the transfer on the data channel. Thus, in one embodiment, each multimedia device uses the PCI bus address and control signals to set up a date transfer on the respective memory data channel as discussed with reference to FIG. 3A. A multimedia device may also use the PCI bus address and control signals to set up periodic transfers on the respective memory data channel. Thus, in a similar manner to that discussed above with respect to FIG. 3d, once the device has set up the periodic transfer, the memory 110 periodically transfers data to the multimedia devices, or vice versa, at periodic intervals.

In the embodiment of FIG. 19, arbitration logic 936 is comprised in the chipset 106 and/or in the memory controller 934 and coupled to the memory controller 934. The arbitration logic 936 receives memory requests from each of the devices 902–910 and performs arbitration for the devices 902–910 attempting to access the main memory 110. In this embodiment, the multimedia devices 902–910 provide request signals on their respective channel to the arbitration logic 936, and the arbitration logic 936 grants main memory access according to a desired arbitration method. The memory controller 934 also routes data transfers from the main memory 110 to the respective memory data channels.

Figure 20:
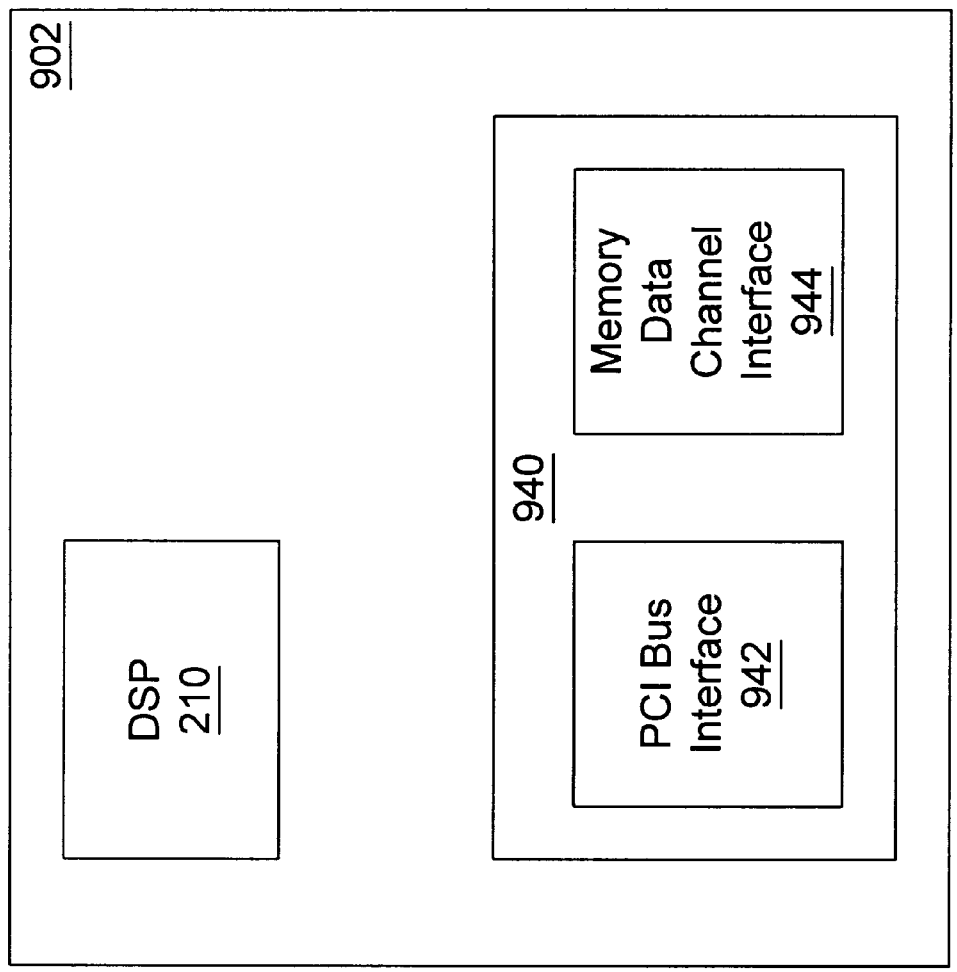
FIG. 20 is a block diagram of a multimedia device or multimedia device in the computer system of FIG. 19.

FIG. 20—Multimedia Devices

Referring now to FIG. 20, a block diagram is shown illustrating one of the multimedia devices 902–910, such as multimedia device 902. As shown, the multimedia device 902 includes interface logic 940 comprising PCI interface circuitry 942 for communicating on the PCI bus 120, and also including memory data channel interface logic 944 for interfacing to the respective data channel. The multimedia device 902 also may include a digital signal processor (DSP) 210 or other hardware circuitry for implementing a multimedia or communications function. Each of the multimedia devices 902–910 preferably includes the interface logic 940, as shown in FIG. 20.

The multimedia devices 902–910 preferably use their respective memory data channel only for high speed data transfers of real-time stream data information and/or periodic data transfers to or from the main memory 110. In an alternate embodiment, the memory data channels are used by each multimedia device for any of various types of multimedia or communications data transfers to or from main memory 110.

In one embodiment, each memory data channel includes only data lines, such as an 8 bit or 16 bit data path, and does not include address or control portions. In this embodiment of the invention, as mentioned above, each of the multimedia devices 902–910 uses the PCI bus 120 for addressing and control for transfers on the respective memory data channel.

Figure 21:
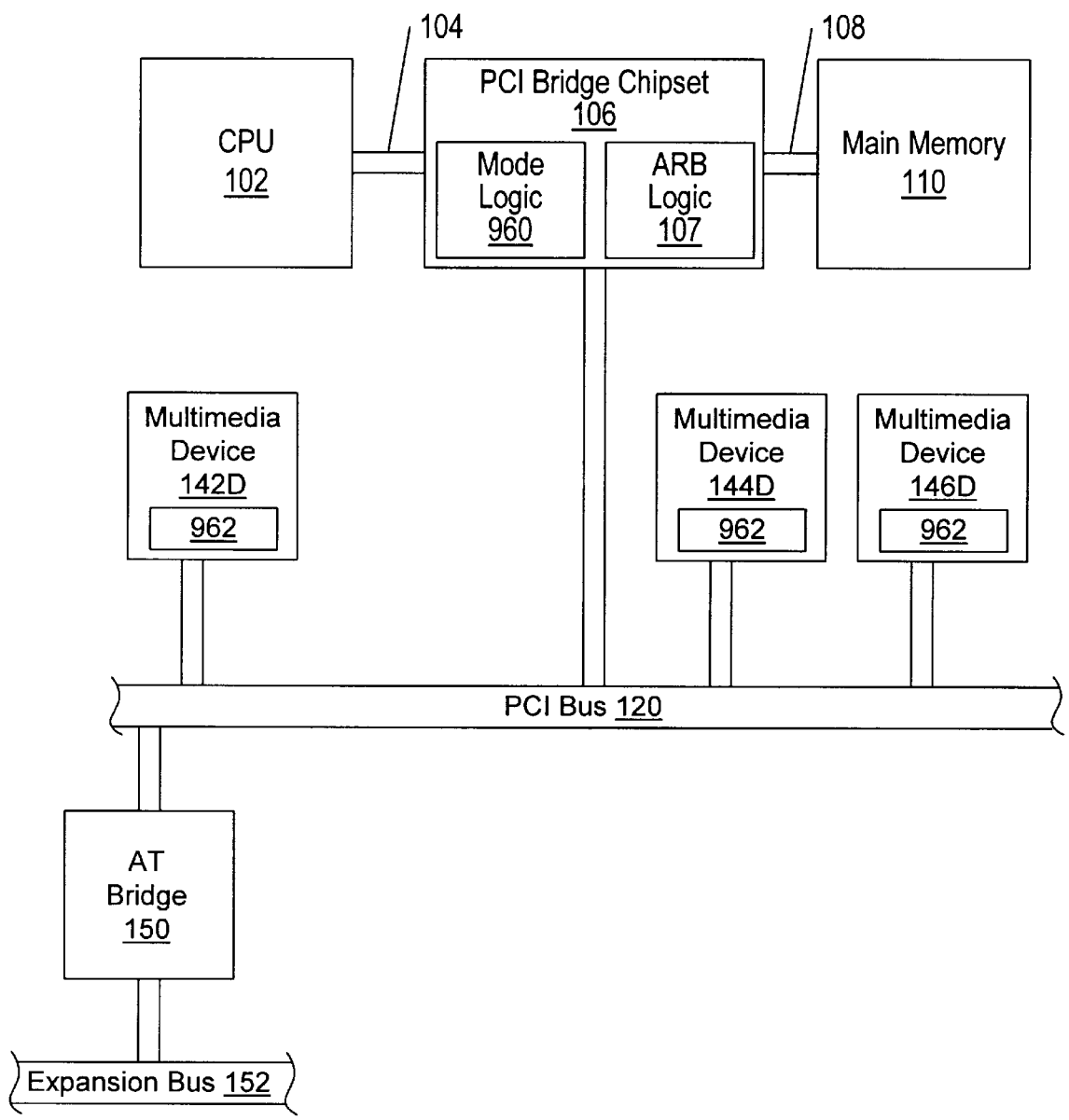
FIG. 21 is a block diagram of a computer system having an expansion bus which includes a multimedia mode for high speed multimedia transfers.

FIG. 21—PCI Bus Including a Real-Time Mode

Referring now to FIG. 21, a computer system is shown which includes an expansion bus, preferably a PCI bus 120, and which includes mode logic which selects between different modes of the PCI bus 120. The computer system of FIG. 21 is similar to the computer system of FIG. 1. However, the mode logic in the computer system of FIG. 21 is operable to place the PCI bus 120 in either a normal PCI mode or in a real-time /multimedia mode optimized for multimedia transfers of periodic data. As described below, multimedia devices use the PCI bus 120 for normal PCI transfers and also use the PCI bus lines in the multimedia mode for high speed data multimedia transfers, preferably transfers of periodic multimedia data. In the following description, elements which are preferably identical to elements previously described include the same reference numerals for convenience.

As shown, the computer system includes a central processing unit (CPU) 102 which is coupled through a CPU local bus 104 to a host/PCI/cache bridge or chipset 106. The chipset 106 includes various bridge logic, peripheral logic and arbitration logic 107, as described above with reference to FIG. 1. The chipset 106 also includes mode logic 960 according to the present invention.

The bridge or chipset 106 couples through a memory bus 108 to main memory 110. The main memory 110 is preferably DRAM (dynamic random access memory) or EDO (extended data out) memory, or other types of memory, as desired. The chipset logic 106 preferably includes a memory controller for interfacing to the main memory 110.

The host/PCI/cache bridge or chipset 106 interfaces to a local expansion bus or system bus 120. In the preferred embodiment, the local expansion bus 120 is the peripheral component interconnect (PCI) bus 120. However, it is noted that other local buses may be used, such as the VESA (Video Electronics Standards Association) VL bus. Various types of devices may be connected to the PCI bus 120. Expansion bus bridge logic 150 and an expansion bus 152 may also be coupled to the PCI bus 120, as described above. As mentioned above, the mode logic 960 is operable to place the PCI bus 120 in either a normal PCI mode or in a real-time /multimedia mode optimized for multimedia transfers of periodic data.

The computer system shown in FIG. 21 optionally includes a real-time bus, also referred to as a multimedia bus 130. The multimedia bus 130 preferably includes a 32 or 64 bit data path and may include address and control portions. The computer system shown in FIG. 21 may include a dedicated control channel, such as that shown in FIG. 7, as desired. In the embodiment of FIG. 21, the multimedia bus 130 is optionally provided to augment or supplement the PCI bus 120 when the PCI bus 120 is in multimedia mode.

Figure 22:
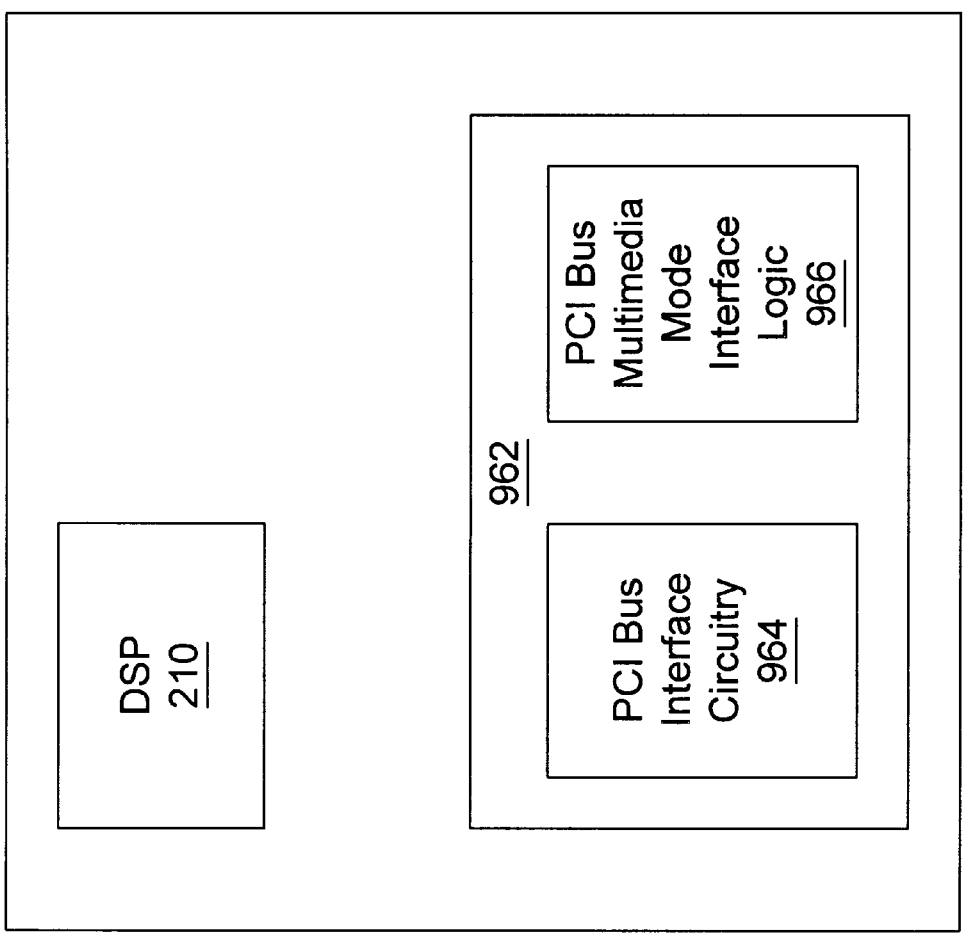
FIG. 22 is a block diagram of a multimedia device or multimedia device in the computer system of FIG. 21.

One or more multimedia devices or multimedia devices 142D, 144D, and 146D are coupled to each of the PCI bus 120 and the multimedia bus 130. As shown in FIG. 22, the multimedia devices 142D–146D each include bus interface circuitry 962 which includes standard PCI interface circuitry 964 for interfacing to the PCI bus 120 when the PCI bus is in a normal PCI mode. The bus interface circuitry 962 also includes interface logic 966 for interfacing to the PCI bus 120 when the PCI bus 120 is in the multimedia mode. The bus interface circuitry 962 also includes interface logic 968 for interfacing to the optional multimedia bus 130. The multimedia devices 142D–146D may be any of various types of input/output devices, including multimedia devices and communication devices, as described above. The multimedia devices 142D–146D are preferably similar to the multimedia devices 142–146 described above, except that the interface logic 962 in the multimedia devices 142D–146D each include the interface logic for interfacing to the PCI bus 120 in multiple modes. As described above, the multimedia devices 142D–146D may comprise video accelerator or graphics accelerator cards, video playback cards, MPEG decoder cards, sound cards, network interface cards, SCSI adapters for interfacing to various input/output devices, such as CD-ROMS and tape drives, or other devices as desired.

Thus, the multimedia devices 142D–146D communicate with each other and with the CPU 102 and main memory 110 via the PCI bus 120, as is well known in the art. The multimedia devices 142D–146D also communicate data between using the PCI bus signal lines 120 when the PCI bus 120 is in the multimedia mode. As noted above, the real-time bus or multimedia bus 130 is optionally used to supplement the PCI bus 120 when the PCI bus 120 is in the multimedia mode.

In the preferred embodiment of the invention of FIG. 21, the multimedia mode comprises placing the system bus or PCI bus 120 in a special mode optimized for real-time data transfers. In one embodiment of FIG. 21, the special mode comprises a byte sliced mode which uses different byte lanes or channels of the PCI data lines for different types of multimedia transfers as described above. Thus, 16 bits of the PCI bus may be used for video transfers while the remaining 16 bits may be used for audio transfers simultaneously. Alternatively, the special mode comprises placing the PCI bus 120 in a timesliced or timeslotted mode as described above with reference to FIGS. 11 and 12. Other types of multimedia modes may be used as desired.

C0NCLUSION

Therefore, the present invention comprises a novel computer system architecture which increases the performance of real-time applications. The computer system includes a PCI local bus and a real-time or multimedia bus. The multimedia bus may be used only for periodic data, and either the PCI bus or a separate control channel is used for addressing and control data. In one embodiment, the multimedia bus comprises two or separate channels for video, audio, and communications. A method is also disclosed which provides for improved performance of periodic data transfers on the multimedia bus. Distributed and centralized intelligence is also included in the various peripheral devices which provide for time slotting and improved data transfer performance.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for transferring periodic multimedia data on a bus in a computer system, wherein the computer comprises a CPU, main memory coupled to the CPU which stores data accessible by the CPU, bridge logic coupled to the CPU and the main memory, a bus coupled to the bridge logic which transfers multimedia data, and a plurality of multimedia devices coupled to the bus, the method comprising:

a first multimedia device generating addressing and control signals on the bus for a multimedia bus transfer, wherein the multimedia bus transfer is intended for a second multimedia device;

the first multimedia device generating one or more request signals on the bus for requesting that the multimedia bus transfer be a periodic multimedia data transfer;

the second multimedia device receiving the addressing and control signals on the bus for the multimedia bus transfer;

the second multimedia device receiving the one or more request signals;

the first multimedia device performing a plurality of multimedia bus transfers comprising periodic multimedia data transfers after the first multimedia device generating said addressing and control signals and said one or more request signals, wherein said plurality of multimedia data transfers comprise the first multimedia device transferring said periodic multimedia data on the bus to the second multimedia device, wherein said periodic multimedia data transfers are performed periodically on the bus, wherein said periodic multimedia data transfers do not require further control or handshaking signals prior to said periodic multimedia data transfers.

2. The method of claim 1, further comprising:

the second multimedia device providing one or more handshake signals on the bus to the first multimedia device for indicating said periodic multimedia data transfers can proceed, wherein said providing one or more handshake signals on the bus to the first multimedia device for indicating said periodic multimedia data transfers can proceed occurs in response to the second multimedia device receiving the one or more request signals on the bus requesting said periodic multimedia data transfer.

3. The method of claim 2, further comprising:

wherein the one or more request signals includes the first multimedia device transferring information regarding said periodic multimedia data transfer.

4. The method of claim 3, wherein said information regarding said periodic multimedia data transfer includes periodicity information indicating an approximate period or frequency at which said periodic multimedia data transfers occur.

5. The method of claim 4, further comprising:

the second multimedia device determining if the second multimedia device can guarantee availability at said frequency specified in said information regarding said periodic multimedia data transfer;

wherein the second multimedia device providing said one or more handshake signals on the bus to the first multimedia device indicating said multimedia bus transfer comprising periodic multimedia data can proceed is performed in response to the second multimedia device determining that the second multimedia device can guarantee availability at said frequency specified in said information regarding said periodic multimedia data transfer.

6. The method of claim 1, wherein said bus is the peripheral component interconnect (PCI) bus.

7. The method of claim 1, wherein said bus is a dedicated multimedia bus.

8. The method of claim 1, wherein said periodic multimedia data comprises motion video data at a plurality of frames per second.

9. The method of claim 1, wherein said periodic multimedia data comprises audio data at a plurality of cycles per second.

10. The method of claim 1, wherein said periodic multimedia data comprises communication data at a plurality of transmissions per second.

11. A computer system, comprising:

a CPU;

main memory coupled to the CPU which stores data accessible by the CPU;

bridge logic coupled to the CPU and to the main memory, wherein the bridge logic includes a memory controller coupled to the main memory and also includes bus interface logic;

a bus coupled to the bridge logic, wherein said bus includes a plurality of data lines and control lines;

a plurality of multimedia devices coupled to said bus, wherein each of said multimedia devices performs operations on said bus, wherein the operations include normal data transfers and periodic data transfers, wherein each of said multimedia devices includes:

means for generating one or more request signals on the bus to a target multimedia device requesting that a periodic data transfer is desired;

means for receiving one or more request signals on the bus from a source multimedia device requesting that a periodic data transfer is desired;

means for performing a plurality of periodic data transfers on the bus comprising periodic multimedia data to the target multimedia device, wherein said plurality of periodic data transfers occur after said one or more request signals have been generated, wherein said plurality of periodic data transfers on the bus comprise transfers of said periodic data on the bus to the target multimedia device, wherein said plurality of periodic data transfers on the bus are performed periodically on the bus, wherein said periodic data transfers do not require further control or handshaking signals prior to said periodic data transfers.

12. The computer system of claim 11, wherein said means for receiving includes means for providing one or more handshaking signals on the bus to a source multimedia device indicating a periodic data transfer can proceed, wherein said means for providing operates in response to the second multimedia device receiving the one or more request signals on the bus indicating said periodic data transfer is desired.

13. The computer system of claim 11, wherein said means for generating also transfers information regarding said periodic data transfer to the target multimedia device.

14. The computer system of claim 13, wherein said information regarding said periodic data transfer includes periodicity information indicating an approximate period or frequency at which said periodic data transfers occur.

15. The computer system of claim 14, wherein said means for receiving determines if the multimedia device can guarantee availability at a frequency specified in said periodicity information received from the source multimedia device;

wherein said means for providing the source multimedia device indicating said transfer comprising periodic multimedia data can transmits said one or more handshaking signals in response to the means for receiving determining that the multimedia device can guarantee availability at said frequency specified in said periodicity information received from the source multimedia device.

16. The computer system of claim 11, wherein said bus is the peripheral component interconnect (PCI) bus.

17. The computer system of claim 11, wherein said bus is a dedicated multimedia bus.

18. The method of claim 11, wherein said periodic data comprises motion video data at a plurality of frames per second.

19. The computer system of claim 11, wherein said periodic data comprises audio data at a plurality of cycles per second.

20. A method for transferring periodic multimedia data on a bus in a computer system, wherein the computer system comprises a CPU, main memory coupled to the CPU which stores data accessible by the CPU, bridge logic coupled to the CPU and the main memory, a bus coupled to the bridge logic which transfers multimedia data, and a plurality of multimedia devices coupled to the bus, the method comprising:

a first multimedia device generating addressing and control signals on the bus for a multimedia bus transfer, wherein the multimedia bus transfer is intended for a second multimedia device, wherein the multimedia bus transfer is one of a set of transfer types including a normal data transfer and a periodic multimedia data transfer;

the first multimedia device generating one or more request signals on the bus for requesting that the multimedia bus transfer be said periodic multimedia data transfer, wherein the one or more request signals include the first multimedia device transferring information regarding said periodic multimedia data transfer, wherein said information includes periodicity information indicating an approximate period or frequency at which said periodic multimedia data transfers are to occur;

the second multimedia device receiving the addressing and control signals on the bus for the multimedia bus transfer;

the second multimedia device receiving the one or more request signals;

the second multimedia device determining if the second multimedia device can guarantee availability at said frequency specified in said information regarding said periodic multimedia data transfer;

the second multimedia device providing one or more handshake signals on the bus to the first multimedia device for indicating said periodic multimedia data transfer can proceed, wherein said providing one or more handshake signals occurs in response to the second multimedia device receiving the one or more request signals, wherein the second multimedia device providing said one or more handshake signals is performed in response to the second multimedia device determining that the second multimedia device can guarantee availability at said frequency specified in said information regarding said periodic multimedia data transfer;

the first multimedia device performing one or more multimedia bus transfers comprising periodic multimedia data after the first multimedia device generating said addressing and control signals and said one or more request signals, wherein said one or more multimedia bus transfers comprise the first multimedia device transferring said periodic multimedia data on the multimedia bus to the second multimedia device, wherein at least a subset of said plurality of multimedia bus transfers are performed periodically on the multimedia bus, wherein said periodic multimedia data transfers do not require further control or handshaking signals prior to said periodic multimedia data transfers.

21. A computer system, comprising:

a CPU;

main memory coupled to the CPU which stores data accessible by the CPU;

bridge logic coupled to the CPU and to the main memory, wherein the bridge logic includes a memory controller coupled to the main memory and also includes bus interface logic;

a bus coupled to the bridge logic, wherein said bus includes a plurality of data lines and control lines;

a plurality of multimedia devices coupled to said bus, wherein each of said multimedia devices perform operations on said bus, wherein the operations include a set of data transfer types, wherein said set of data transfer types includes normal data transfers and periodic data transfers, wherein each of said multimedia devices includes:

request logic configured to generate one or more request signals on the bus to a target multimedia device requesting said periodic data transfer is desired, wherein said request logic is further configured to transfer information regarding said periodic data transfer to the target multimedia device, wherein said information regarding said periodic data transfer includes periodicity information indicating an approximate period or frequency at which said periodic data transfers occur;

receiving logic coupled to receive said one or more request signals, wherein said receiving logic is further configured to determine if the multimedia device can guarantee availability at a frequency specified in said periodicity information received from the source multimedia device, wherein said receiving module includes a handshaking module configured to provide responsively one or more handshaking signals on the bus to a source multimedia device indicating a periodic multimedia data transfer can proceed;

I/O logic configured to perform one or more bus transfers of multimedia data comprising periodic multimedia data to the target multimedia device, wherein said bus transfers include said periodic data transfers, wherein said periodic data transfers occur after said one or more request signals have been generated, wherein said periodic data transfers do not require further control or handshaking signals prior to said periodic data transfers.

* * * * *

UNITED STATES PATENT AND TRADEMARK OFFICE
CERTIFICATE OF CORRECTION

PATENT NO. : 5,905,879

DATED : May 18, 1999

INVENTOR(S) : Andy Lambrecht

It is certified that error appears in the above-indentified patent and that said Letters Patent is hereby corrected as shown below:

Claim 15, col. 30, lines 35-37, please delete "the source multimedia device indicating said transfer comprising periodic multimedia data can".

Signed and Sealed this

Twelfth Day of October, 1999

Attest:

Q. TODD DICKINSON

Attesting Officer

Acting Commissioner of Patents and Trademarks